(12) United States Patent
Sato et al.

(10) Patent No.: US 7,643,115 B2
(45) Date of Patent: Jan. 5, 2010

(54) LIQUID CRYSTAL DISPLAY UNIT

(75) Inventors: Takeshi Sato, Kokubunji (JP); Yoshiaki Toyota, Hachioji (JP)

(73) Assignee: Hitachi Displays, Ltd., Chiba (JP)

( * ) Notice: Subject to any disclaimer, the term of this patent is extended or adjusted under 35 U.S.C. 154(b) by 114 days.

(21) Appl. No.: 11/907,058

(22) Filed: Oct. 9, 2007

(65) Prior Publication Data
US 2008/0094554 A1 Apr. 24, 2008

(30) Foreign Application Priority Data
Oct. 20, 2006 (JP) .............................. 2006-286007

(51) Int. Cl.
G02F 1/1368 (2006.01)
G02F 1/1335 (2006.01)

(52) U.S. Cl. .................. 349/114; 349/38; 349/113; 349/117; 349/122; 349/141

(58) Field of Classification Search .................. 349/38, 349/39, 42, 113, 114, 117, 138, 139, 143, 349/146; 345/87, 88, 92
See application file for complete search history.

(56) References Cited

U.S. PATENT DOCUMENTS

| | | | |
|---|---|---|---|
| 6,727,969 B2 * | 4/2004 | Chang et al. | 349/143 |
| 6,798,480 B2 * | 9/2004 | Ono et al. | 349/115 |
| 6,914,656 B2 * | 7/2005 | Sakamoto et al. | 349/141 |
| 7,088,409 B2 * | 8/2006 | Itou et al. | 349/114 |
| 7,362,400 B2 * | 4/2008 | Itou et al. | 349/141 |
| 7,486,351 B2 * | 2/2009 | Itou et al. | 349/99 |
| 7,502,084 B2 * | 3/2009 | Nishimura | 349/114 |
| 2006/0256268 A1 * | 11/2006 | Jeong et al. | 349/141 |
| 2007/0146591 A1 * | 6/2007 | Kimura et al. | 349/114 |
| 2007/0222925 A1 * | 9/2007 | Park et al. | 349/114 |

FOREIGN PATENT DOCUMENTS

| | | |
|---|---|---|
| JP | 11-101992 | 7/1998 |
| JP | 2003-241189 | 12/2002 |
| JP | 2005-338256 | 5/2004 |

\* cited by examiner

*Primary Examiner*—Dung Nguyen
*Assistant Examiner*—Tai Duong
(74) *Attorney, Agent, or Firm*—Stites & Harbison PLLC; Juan Carlos A. Marquez, Esq.

(57) ABSTRACT

The present invention provides a transreflective type liquid crystal display unit, which can reduce power consumption of backlight and displays high-quality image. The liquid crystal display unit of the present invention comprises a first reflective electrode 105, which is installed on inner surface of one substrate 100 and has reflective surfaces on front and rear surfaces and is designed to have reflective lens structure with a convex portion to face to a counter electrode and has an opening 153 at the vertex of said convex portion. Further, the liquid crystal display unit has a second reflective film 104 having reflective surface on the surface facing to the first reflective electrode 105 between the first reflective electrode 105 and said one substrate 100 and under the opening 153 of the first reflective electrode 105. A light entering from the direction of said one substrate 100 is reflected by the rear surface of the first reflective electrode 105 and by the front surface of the second reflective film 104, and the light is converged to the opening 153 of the first reflective electrode 105 and is allowed to pass toward the other substrate 200.

21 Claims, 31 Drawing Sheets

Diameter of reflective electrode convex ~curvature radius of convex region

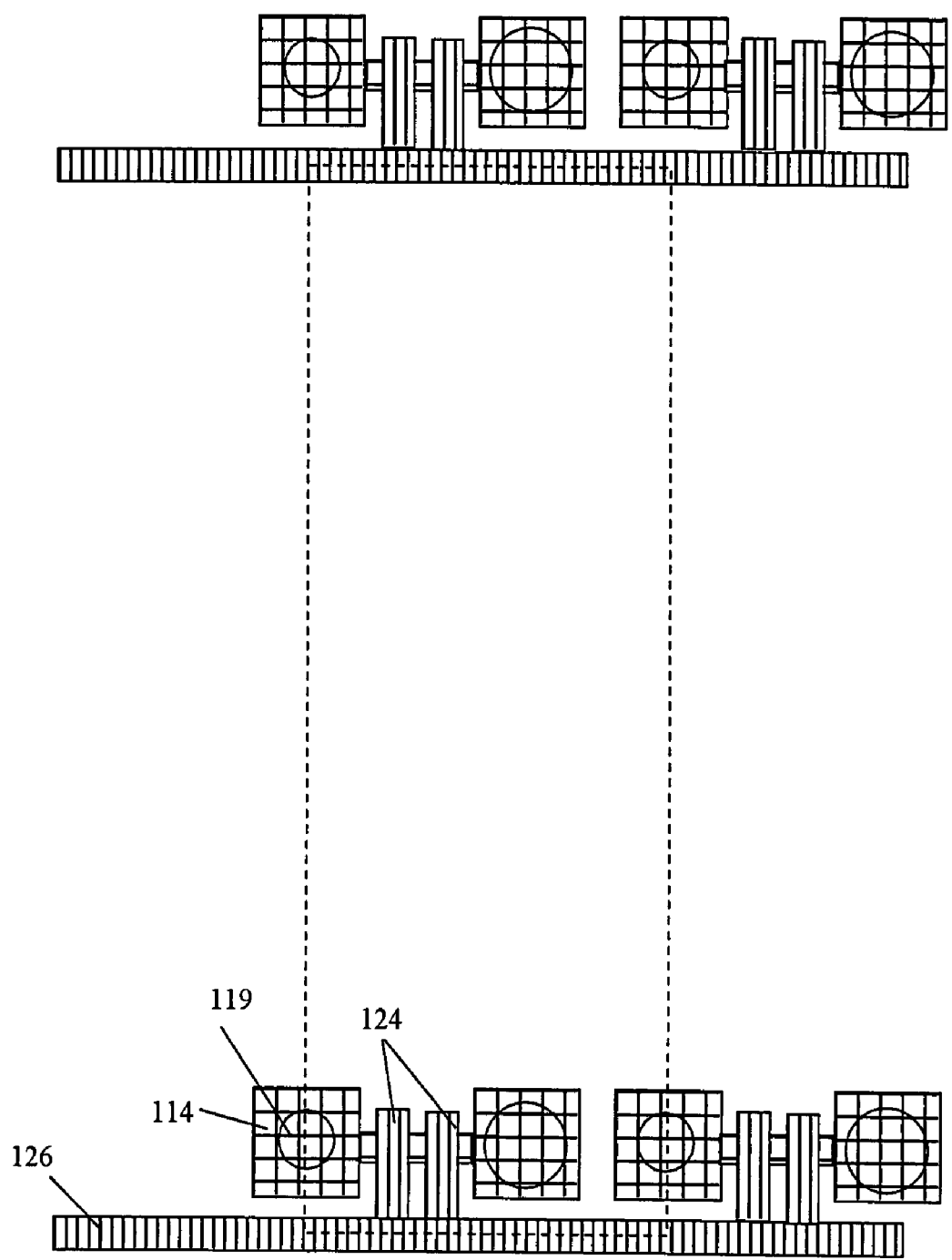

LIQUID CRYSTAL DISPLAY UNIT

BACKGROUND OF THE INVENTION

1. Field of the Invention

The present invention relates to a liquid crystal display unit. In particular, the invention relates to a transreflective type liquid crystal display unit to provide high image quality by improving transmittance and to reduce power consumption of backlight.

2. Description of the Prior Art

FIG. 30 is a cross-sectional view to explain an example of arrangement near a pixel of a transreflective type liquid crystal display unit according to the prior art. FIG. 31 is a plan view to explain an example of arrangement near a pixel shown in FIG. 30. This transreflective type liquid crystal display unit comprises one substrate (hereinafter referred as "TFT substrate") 100 with a thin-film transistor on it and a substrate with a color filter on it (hereinafter referred as "counter substrate") 200, and a liquid crystal 300 sealed between the two substrates. On rear surface of the TFT substrate 100, a backlight is installed, but it is not shown in the figure.

The TFT substrate 100 has a transparent pixel electrode 108 and a reflective pixel electrode 105 driven by a TFT 102 on inner surface of a transparent insulating substrate 101 made of glass or the like. The reflective pixel electrode 105 is formed on the transparent pixel electrode 108. The transparent pixel electrode 108 allows a transmitting light $L_T$ from the backlight to pass, and the reflective pixel electrode 105 reflects external light and turns it to a reflection light $L_R$. Under the reflective pixel electrode 150, a storage capacitor 109 is provided via a gate insulator film 125 between a capacity metal film 124A being in the same layer as the gate electrode 124 of the TFT 102 and a p-Si film 114 being on the same layer as the channel of the TFT 102. The reflective pixel electrode 105 has surface roughness (convex and concave portions) and scatters the external light $L_R$ and reflects it in the direction of the counter substrate 200 and turns it to a reflection light $L_R$. In the arrangement as described above, the light from the backlight is interrupted by the storage capacitor disposed under the reflective electrode. As a result, light transmittance is decreased.

The gate electrode 124 and the capacity metal film 124A are covered by an interlayer insulator film 118. Via the interlayer insulator film 118 and the gate insulator film 125, a bus line (=a signal line) is connected to one of the source-drain electrodes of TFT, and the pixel electrodes (transparent pixel electrode 108 and the reflective pixel electrode 105) are connected to the other of the source-drain electrodes via an organic PAS film 106A. An alignment film 110 is disposed to cover the transparent pixel electrode 108 and the reflective pixel electrode 105 to make up the pixel electrode.

The counter substrate 200 comprises a color filter 202, a protective film 203 and an alignment film 204 arranged in this order on inner surface of the transparent insulator substrate 201 made of glass or the like. A light shielding film (black matrix) is generally arranged between adjacent color filter and the alignment film, but it is not shown in the figure. The protective film 203 in the region to match the region of the reflective pixel electrode 105 is expanded into the liquid crystal 200 to reduce the thickness (d) of the liquid crystal 300 to ½ so that the value of Δn·d will be the same for the reflection light $L_R$ and the transmitting light $L_T$.

One pixel is formed in a region surrounded by two gate lines 126 adjacent to each other and by two signal lines 127 adjacent to each other. On a part of this region, there is provided a pixel electrode, which has the TFT 102 and comprises a transparent pixel electrode 108 and a reflective pixel electrode 105 driven by the TFT 102. On a portion of the reflective pixel electrode 105, a storage capacitor 109 is disposed. One of the electrodes of this storage capacitor 109 is connected to a storage line 127. In FIG. 31, surface roughness (convex and concave portions) 128 of the organic PAS film 106A are shown.

FIG. 32 is an equivalent circuit diagram of one pixel explained in connection with FIG. 30 and FIG. 31. The same component as in FIG. 30 and FIG. 31 is referred by the same symbol, and detailed description is not given here.

FIG. 33 is a schematical drawing to explain a reflective lens structure in the transreflective type liquid crystal display unit according to the prior art. There is a plurality of projecting blocks 151 made of transparent insulating material in the pixel electrode on inner surface of the TFT substrate 100, and a first reflective film 149 is disposed on it. The first reflective film 149 has an opening at the center of each of the projecting blocks 151, and a second reflective film 150 is formed under each of the openings. A light reflected by the lower portion of the first reflective film 149 is reflected by the second reflective film 150. Then, the light passes through the opening of the first reflective film 149 and is projected in the direction toward the counter substrate 200. In this arrangement, no consideration is given on the arrangement of the pixel electrode, on the arrangement of the storage capacitor, and on display mode of the liquid crystal to improve light utilization efficiency of the light from the viewpoint of liquid crystal driving.

The Patent Document 1 discloses a transreflective type liquid crystal display unit having a reflective lens structure, in which the light beam from the backlight is converged by rear surface of a reflective layer disposed on pixel projection and by the second reflective film and is allowed to pass, thus leading to the substantial improvement of light transmittance. The Patent Document 2 discloses a transreflective type liquid crystal display unit with a storage capacitor on the lower portion of the reflective electrode. Also, the Patent Document 3 discloses a transreflective liquid crystal display unit of transverse electric field type using a transparent storage capacitor.

[Patent Document 1] JP-A-2003-241189
[Patent Document 2] JP-A-Hei-11-101992
[Patent Document 3] JP-A-2005-338256

SUMMARY OF THE INVENTION

In the reflective lens structure according to the prior art as described above, there are the following problems: (1) No consideration is given on the method to mount the components on the TFT substrate. (2) The shape of the electrode of the reflective lens is not coordinated well with the driving of the liquid crystal. (3) The storage capacitor is disposed on the lower portion of the reflective electrode, but transmittance is decreased. (4) Because the reflecting region and the transmitting region are located adjacent to each other, it is difficult to adjust the characteristics of the two regions by changing the thickness of the liquid crystal for transmission and reflection.

To overcome the problems of the prior art as described above, it is an object of the present invention to provide a transreflective type liquid crystal display unit, by which it is possible to reduce the power consumption of the backlight and to display high-quality image.

The liquid crystal display unit of the present invention comprises one substrate (TFT substrate) with a thin-film transistor on it and the other substrate (counter electrode) with a color filter disposed on it, said one substrate and said the other substrate are attached together, and a liquid crystal is sealed in a gap between the two substrates.

The present invention provides a liquid crystal display unit, which comprises a first reflective electrode installed on inner surface of said one substrate and having reflective surfaces on front and rear surfaces, said first reflective electrode having a reflective lens structure with a convex portion to face toward said counter substrate, and having an opening at the vertex of said convex portion;

a second reflective film disposed between said first reflective electrode and said one substrate and under said opening of said first reflective electrode, said second reflective film having reflective surface on the surface facing to said first reflective electrode; and a light entering from said one substrate is reflected by the rear surface of said first reflective electrode and by the front surface of said second reflective film, said light is converged to said opening of said first reflective electrode and is allowed to pass toward said the other substrate.

Also, the present invention provides the liquid crystal display unit as described above, wherein said first reflective electrode of a reflective lens structure with a convex portion is on upper layer of an organic PAS film prepared on said first substrate and is designed in such shape as to match surface roughness of said organic PAS film, said first reflective electrode of a reflective lens structure with a convex portion is on upper layer of an organic PAS film prepared on said first substrate and is designed in such shape as to match surface roughness of said organic PAS film, and said second reflective film is on lower layer of said organic PAS film.

Further, the present invention provides the liquid crystal display unit as described above, wherein the other electrode for driving the liquid crystal is disposed via an insulator film on upper layer of the first reflective electrode, and a storage capacitor is maintained by the first reflective electrode and said the other electrode, and by an insulator film between said first reflective electrode and said the other electrode.

The present invention provide the liquid crystal display unit as described above, wherein a liquid crystal display unit, comprising one substrate with a thin-film transistor provided thereon, and the other substrate with a color filter formed thereon, said one substrate and the other substrate are attached together, and a liquid crystal is sealed in a gap between the two substrates, wherein there are provided:

a first reflective electrode installed on inner surface of said one substrate and having reflective surfaces on front and rear surfaces, said first reflective electrode having a reflective lens structure with a convex portion to face toward said counter substrate, and having an opening at the vertex of said convex portion;

a second reflective film disposed between said first reflective electrode and said one substrate and under said opening of said first reflective electrode, said second reflective film having reflective surface on the surface facing to said first reflective electrode;

said liquid crystal display unit further comprising a transparent pixel electrode for driving said liquid crystal via an insulator film on upper layer of said first reflective electrode, and a reflective electrode formed on said transparent electrode by avoiding said opening of said first reflective electrode; and a light entering from the direction of said one substrate is reflected by rear surface of said first reflective electrode and by front surface of said second reflective film, and said light is converged to said opening of said first reflective electrode and is allowed to pass toward said the other substrate via said transparent pixel electrode.

Also, the present invention provide the liquid crystal display unit as described above, wherein said first reflective electrode of a reflective lens structure with a convex portion is on upper layer of an organic PAS film prepared on said first substrate and is designed in such shape as to match surface roughness of said organic PAS film; and said transparent pixel electrode is formed on an insulator film with surface shape similar to surface roughness of said first reflective electrode on upper layer of said first reflective electrode.

The present invention provide the liquid crystal display unit as described above, wherein Further, a storage capacitor is maintained by said first reflective electrode and said transparent pixel electrode, and by an insulator film between said first reflective electrode and said transparent pixel electrode.

Also, the present invention provide the liquid crystal display unit as described above, wherein a liquid crystal display unit, comprising one substrate with a thin-film transistor provided thereon, and the other substrate with a color filter formed thereon, said one substrate and the other substrate are attached together, and a liquid crystal is sealed in a gap between the two substrates, wherein there are provided:

a first reflective electrode installed on inner surface of said one substrate and having reflective surfaces on front and rear surfaces, said first reflective electrode having a reflective lens structure with a convex portion to face toward said counter substrate, and having an opening at the vertex of said convex portion;

a second reflective film disposed between said first reflective electrode and said one substrate and under said opening of said first reflective electrode, said second reflective film having reflective surface on the surface facing to said first reflective electrode;

said liquid crystal display unit further comprising:

a retardation film formed on upper layer of said first reflective electrode via an organic PAS film;

a transparent common electrode prepared on said retardation film; and a transparent pixel electrode having an opening via an insulator film on upper layer of said transparent common electrode, wherein:

a light entering from the direction of said one substrate is reflected by rear surface of said first reflective electrode and by front surface of said second reflective film and is converged to said opening of said first reflective electrode and is allowed to pass toward said the other substrate.

Further, the present invention provides the liquid crystal display unit as described above, wherein a storage capacitor is maintained by said first reflective electrode and said transparent pixel electrode, and by an insulator film between said first reflective electrode and said transparent pixel electrode; and a color filter and a protective film are provided on inner surface of said the other substrate, and a concave portion is formed on a protective film to match the opening of said transparent pixel electrode.

The present invention is not limited to the arrangement explained in the Embodiments as described above, and various changes and modifications can be made without departing from the spirit and the scope of technical conception of the invention.

The present invention provides the following effects: (1) The advantages of the reflective lens structure can be attained in the existing TFT process by utilizing convex and concave portions of the organic PAS film, and light utilization efficiency can be improved. (2) By providing the transparent electrode in addition to the reflective film, it is possible to optimize the shapes of the electrodes necessary for the driving of the liquid crystal and the shapes of the reflective lens, and this contributes to the improvement of light utilization efficiency. (3) The loss of light due to the storage capacitor can be suppressed, and the light transmittance is improved. (4) Even when the transmitting region and the reflecting region are located adjacent to each other, the driving of the liquid crystal can be optimized. As a result, the deterioration of image quality can be suppressed, and power consumption of the backlight is reduced. The reflectivity can be improved while maintaining the transmittance, and a transreflective type liquid crystal display unit to give high-quality image can be provided.

BRIEF DESCRIPTION OF THE DRAWINGS

FIG. 7 is a plan view of an essential portion of the manufacturing process as explained in FIG. 5 and FIG. 6;

DETAILED DESCRIPTION OF THE PREFERRED EMBODIMENTS

Detailed description will be given below on the best aspect of the invention referring to the attached drawings.

Embodiment 1

Figure 1:
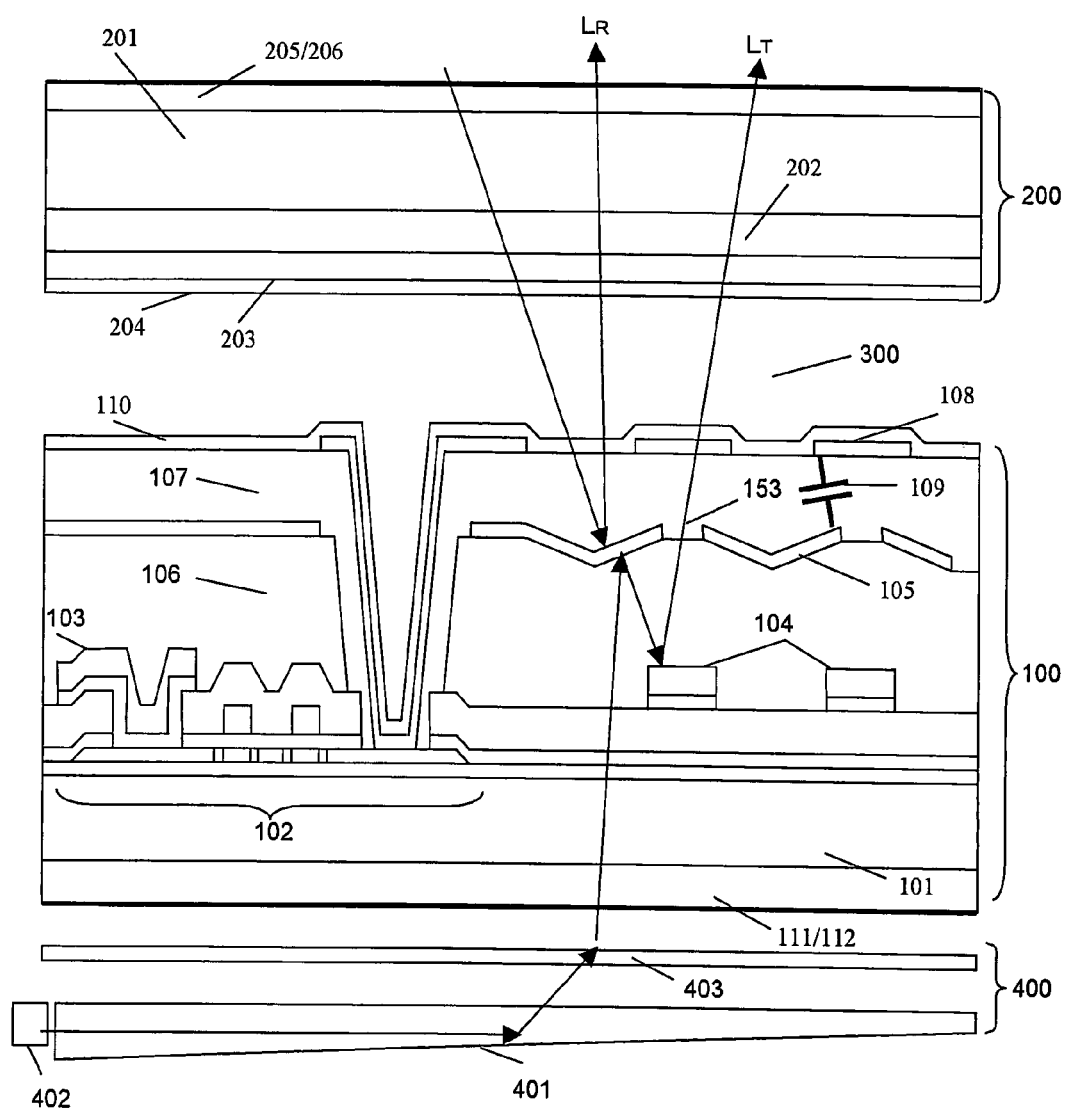
FIG. 1 is a cross-sectional view to explain Embodiment 1 of a transreflective type liquid crystal display unit according to the present invention.

FIG. 1 is a cross-sectional view to explain the Embodiment 1 of a transreflective type liquid crystal display unit according to the present invention. In the Embodiment 1, the present invention is applied to a transverse electric field type liquid crystal display unit. In FIG. 1, a liquid crystal 300 is sealed between a TFT substrate 100 and a counter substrate 200. In the TFT substrate 100, a thin-film transistor (TFT) 102 is formed similarly to FIG. 30 on inner surface of a transparent insulator substrate 101 preferably made of glass plate. Also, in the counter substrate 200, a color filter 202, a protective film 203, and an alignment film 204 are provided on inner surface of the transparent insulator substrate 201 preferably made of glass plate. An alignment film 110 is also formed on the uppermost layer (boundary surface with the liquid crystal 300) of the TFT substrate 100.

Figure 30:
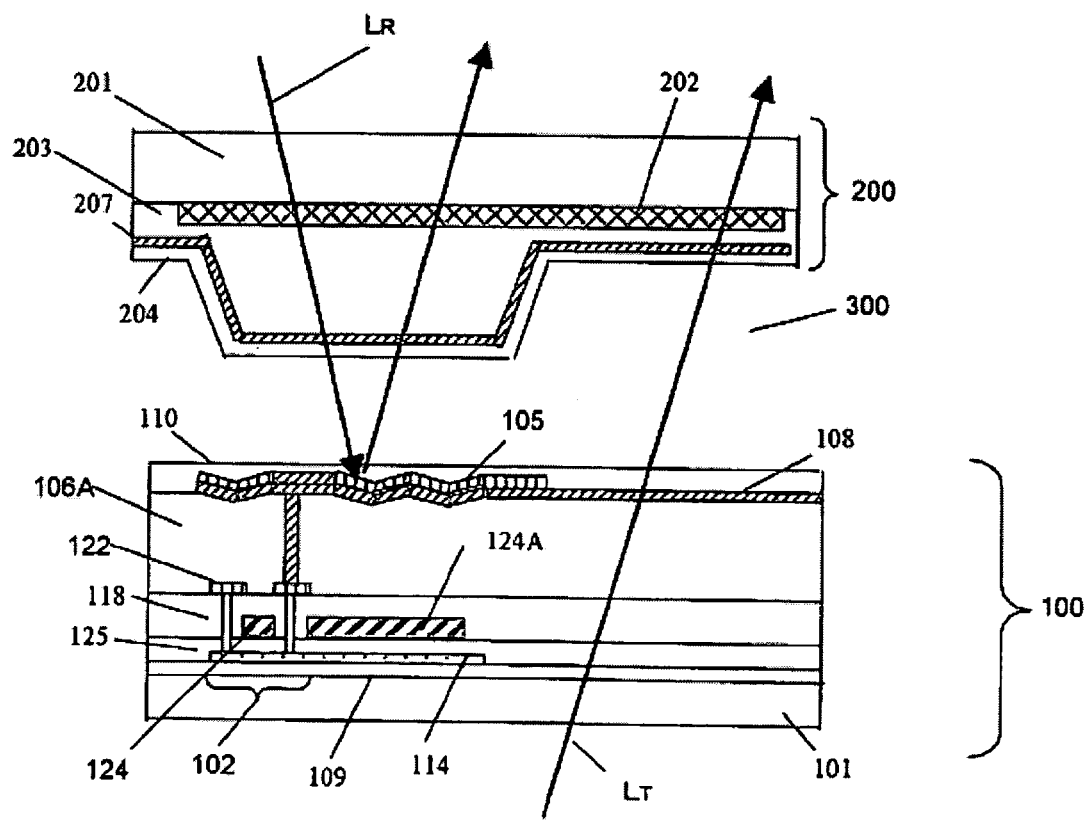
FIG. 30 is a cross-sectional view to explain an example of arrangement near a pixel on the transreflective type liquid crystal display unit according to the prior art.
Figure 31:
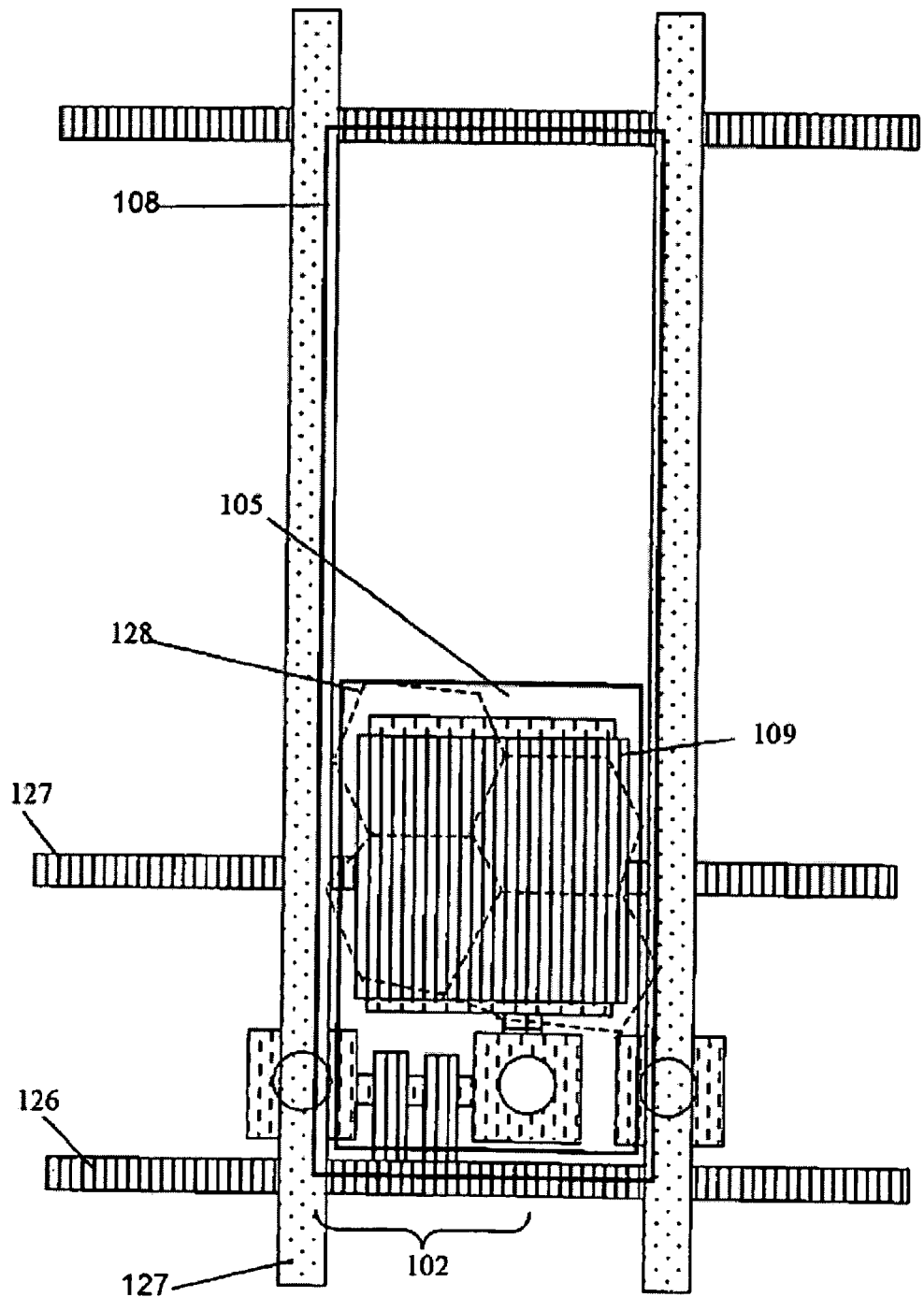
FIG. 31 is a plan view to explain an example of arrangement near a pixel as shown in FIG. 30.
Figure 32:
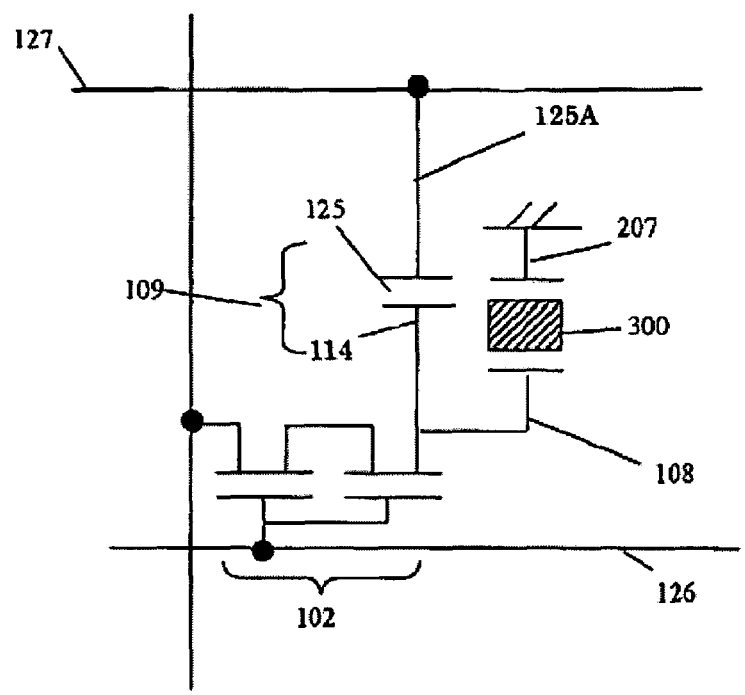
FIG. 32 is an equivalent circuit diagram of a pixel explained in connection with FIG. 30 and FIG. 31.
Figure 33:
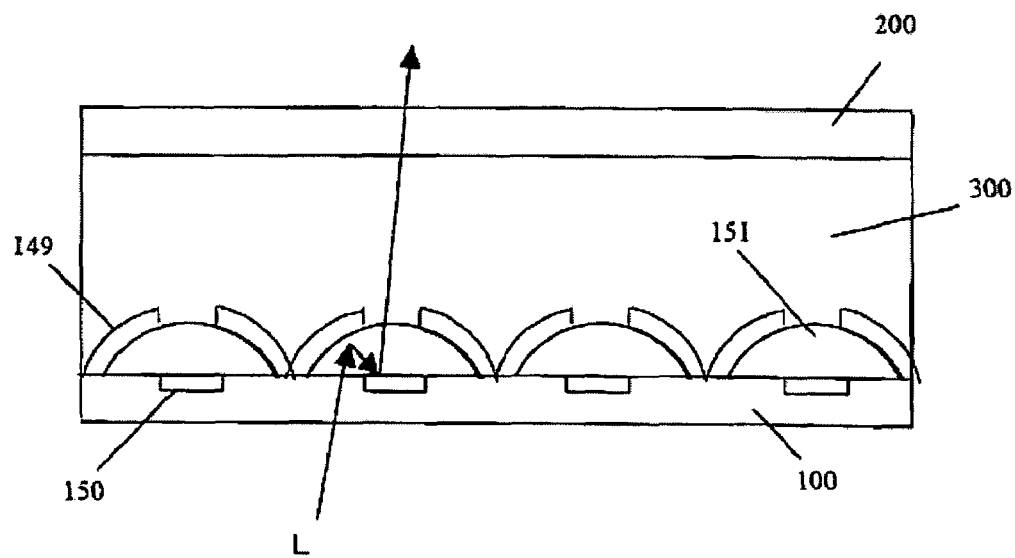
FIG. 33 is a schematical drawing to explain structure of a reflective lens in the transreflective type liquid crystal display unit according to the prior art as explained in connection with FIG. 30 to FIG. 32.

On the rear surface of the TFT substrate 100, a backlight 400 is mounted. The backlight 400 comprises a light guide plate 401, a light source (such as LED) 402, and a prism sheet 403, etc. A diffusion sheet or the like may be included in the prism sheet 403. This is the same as in the liquid crystal display unit shown in FIG. 30. On outer surface of the TFT substrate 100, a polarizer (polarizing plate) 111 and a retardation film 112 are disposed. On outer surface of the counter substrate 200, there are provided a polarizer 205 and a retardation film 206. In FIG. 30, the polarizers and the retardation films are not shown.

A reflective common electrode 105 to serve as a first reflective film is prepared on the TFT substrate 100. Above the reflective common electrode, a transparent pixel electrode 108 comprising a transparent conductive film is formed via an insulator film 107, which is made of organic PAS film. A storage capacitor 109 to maintain a voltage to be applied on the liquid crystal 300 is provided between the reflective common electrode 105 and the transparent pixel electrode 108. The reflective common electrode 105 has its front and rear surfaces as reflective surfaces. The reflective surfaces on the front and the rear surfaces have surface roughness (convex and concave portions) similar to the surface roughness of the organic PAS film, thereby forming a reflective lens. An opening 153 is formed at the top of the convex portion of the reflective common electrode 105. Under the opening 153, there are provided a signal line 103, which is a metal film preferably made of aluminum, and a wiring layer reflective film 104, which serves as a second reflective film of the same layer.

On the reflective common electrode 105, serving as the first reflective film, external light entering via outer surface of the counter substrate 200 is reflected by the surface roughness (convex and concave portions). A light entering from the backlight 400 via the TFT substrate 100 is reflected by rear surface of the reflective common electrode 105. It is further reflected by the wiring layer reflective film 104, which is a second reflective film. The light is then converged to the opening 153 of the reflective common electrode 105 and is projected toward the counter substrate 200. On upper layer of the TFT 103, an organic PAS film 106 is formed.

Figure 2A:
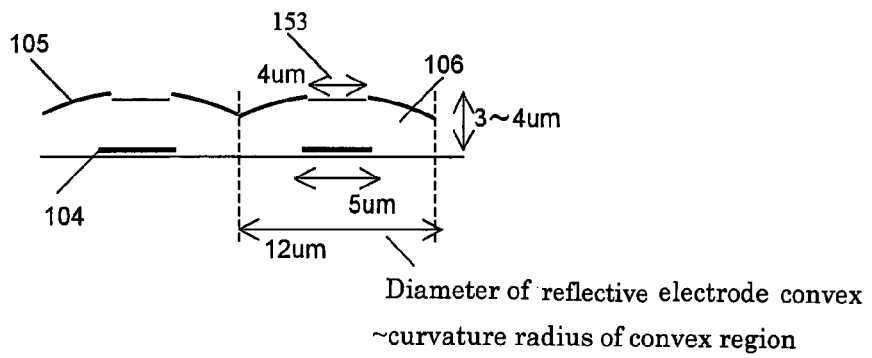
FIG. 2A and FIG. 2B are side schematic views of an arrangement example of a reflection lens in the Embodiment 1 of the invention.
Figure 2B:
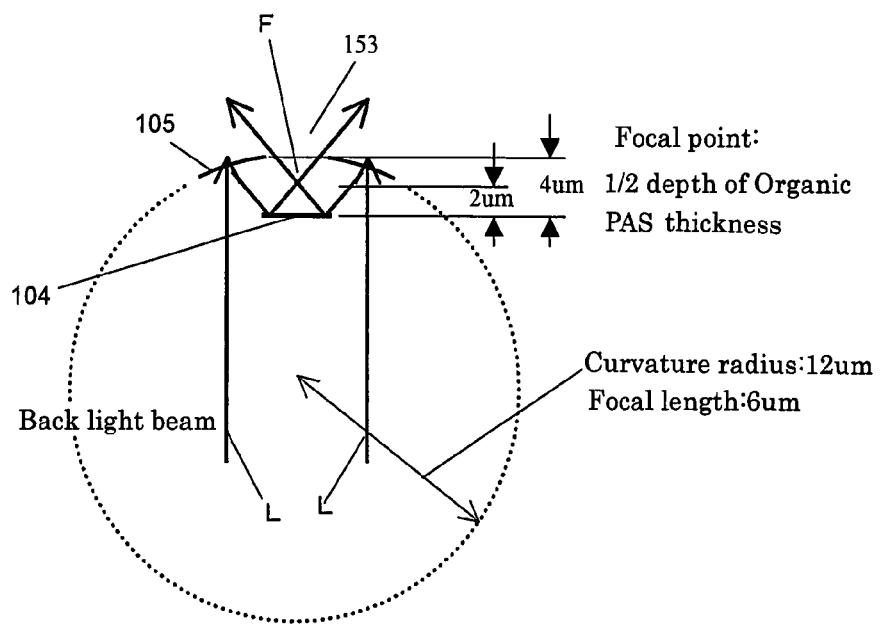

FIG. 2 represents drawings to explain an example of arrangement of the reflective lens in the Embodiment 1. The surface roughness (convex and concave portions) are formed as follows: In FIG. 2 (a), the thickness from the surface of the wiring layer reflective film 104 of the organic PAS film 106 is set to 4 μm at the vertex and to 3 μm at the convex portion. The diameter of the opening 153 formed near the vertex of the convex portion is set to 4 μm, and the diameter of the convex portion of the wiring layer reflective film 104 underneath is set to 5 μm. Curvature radius of the convex portion of the organic PAS film and the gap of the opening is set to about 12 μm.

In this example, focal distance on rear surface of the reflective common electrode 105 is 6 μm. The beam L from the backlight entering vertically from lower portion of the TFT substrate 100 is converged to a point between the front surface of the wiring layer reflective film 104 and the surface of convex portion of the organic PAS film 106 and passes through the opening 153. The thickness of the organic PAS film 106 is estimated to be about ¼ to ⅓ of curvature radius of the convex portion of the organic PAS film 106, and the diameter of the convex portion is set to be approximately equal to curvature radius. The size of the opening 153 and the size of the wiring layer reflective film 104, serving as the second reflective film, are set to about ⅓ of the curvature radius. Thus, it is possible to increase the transmittance.

Figure 3:
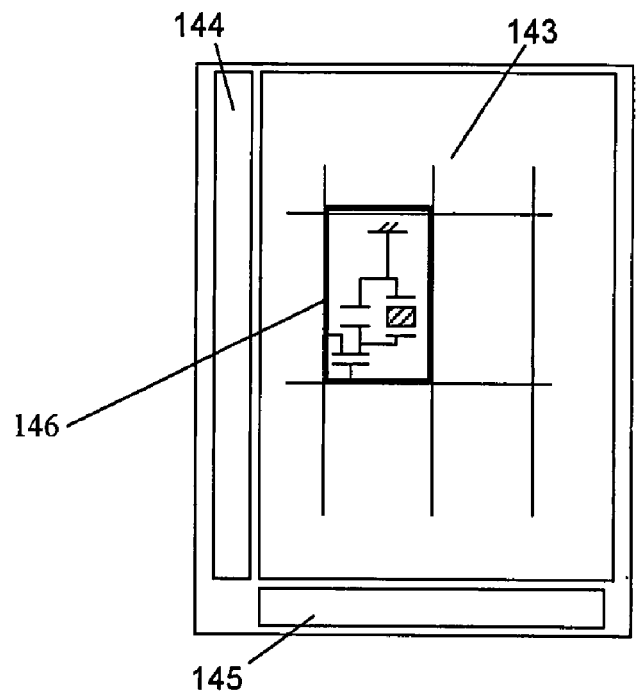
FIG. 3 is a schematical drawing of a TFT substrate, which constitutes the liquid crystal display unit explained in connection with FIG. 1.
Figure 4:
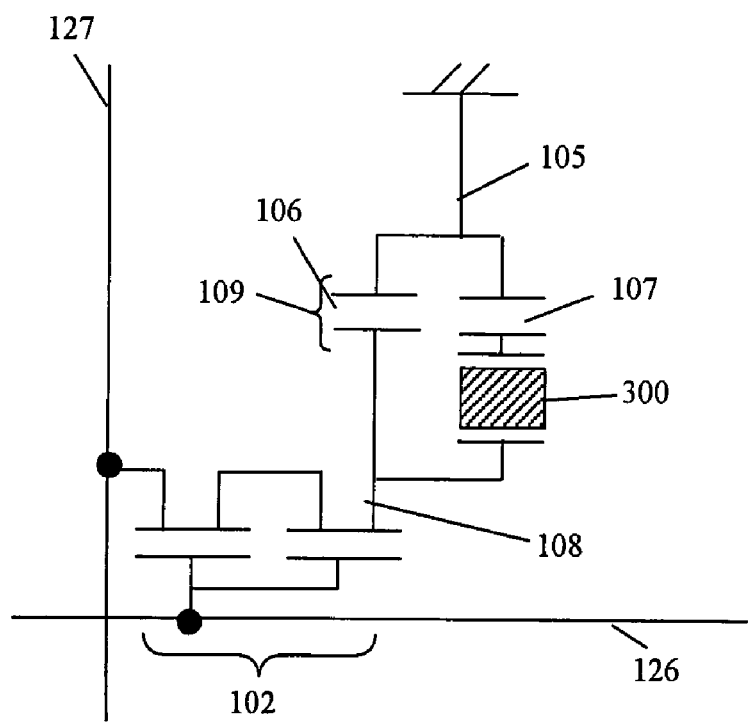
FIG. 4 is an equivalent circuit diagram of a pixel region shown in FIG. 3.
Figure 5A:
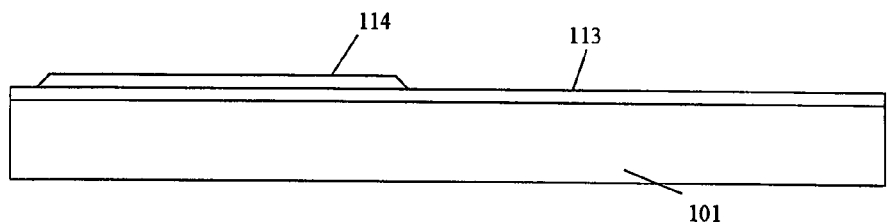
FIG. 5A through FIG. 5D are cross-sectional schematical views at various steps of the manufacturing process of the Embodiment 1 of the transreflective type liquid crystal display unit as shown in FIG. 1.
Figure 5B:
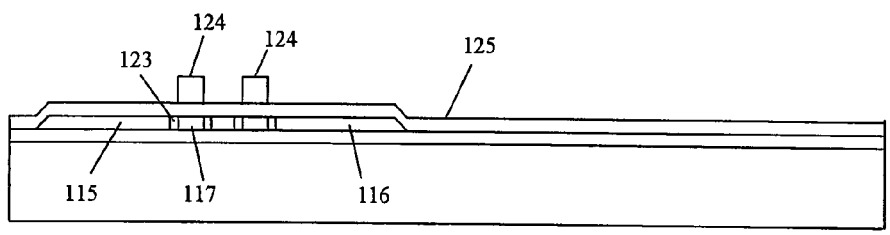
Figure 5C:
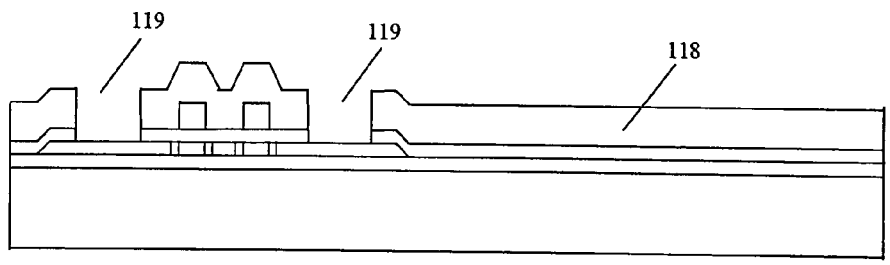
Figure 5D:
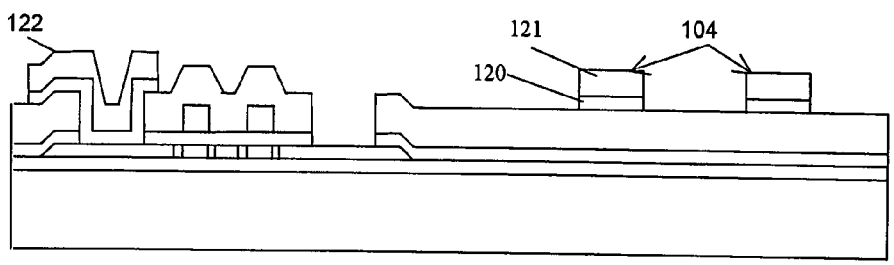

FIG. 3 is a schematical drawing of the TFT substrate, which constitutes the liquid crystal display unit as explained in connection with the FIG. 1. FIG. 4 is an equivalent circuit diagram of a pixel region of FIG. 3. A pixel 146 made up by the TFT and the surrounding circuits including the driving circuits (a gate line driving circuit 144 and a signal line driving circuit 145) are arranged on the substrate 101. On the pixel 146, a TFT to serve as a switch between a signal line 127 and a pixel electrode 108 is designed to act in response to a scanning signal of the gate line 126. When the TFT is turned on, the voltage applied on the pixel electrode 108 is maintained at a constant level even after the TFT has been turned off by the storage capacitor 109 provided between the transparent pixel electrode 108 and the reflective common electrode 105, and the voltage is applied on the liquid crystal 300.

In the Embodiment 1, the storage capacitor 109 is a combination of the transparent electrode 108 and the reflective common electrode 105, and it is disposed above the wiring layer reflective film 104. Because the light beam from the backlight 400 and the external light are not shielded, the light utilization efficiency can be increased. As a result, power consumption of the backlight can be reduced, and the reflectivity can be improved while maintaining the transmittance, and a transreflective type liquid crystal display unit to provide high image quality can be manufactured.

Figure 6A:
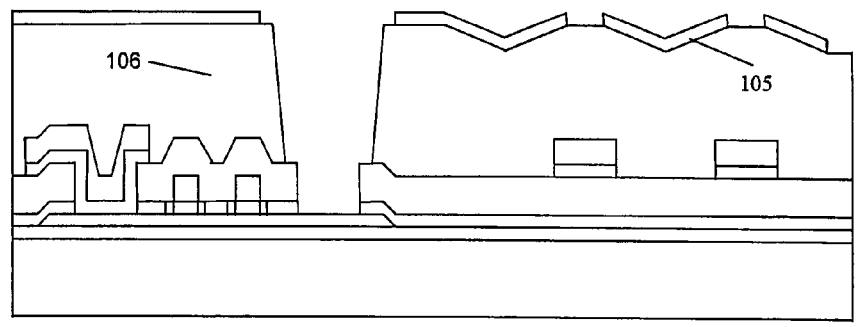
FIG. 6A and FIG. 6B are cross-sectional schematical views at various steps of the manufacturing process, similar to FIG. 5, of the Embodiment 1 of the transreflective type liquid crystal display unit shown in FIG. 1.
Figure 6B:
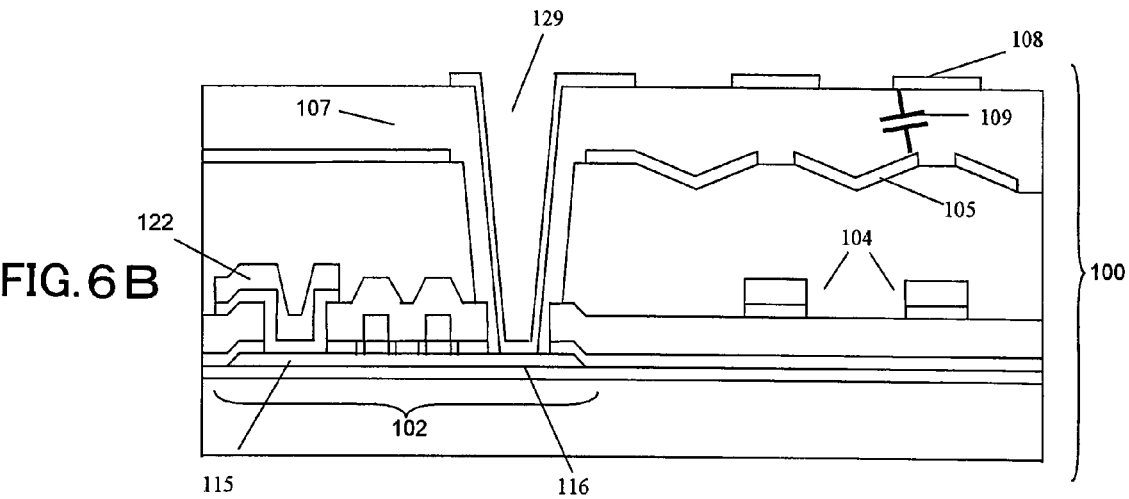
Figure 8:
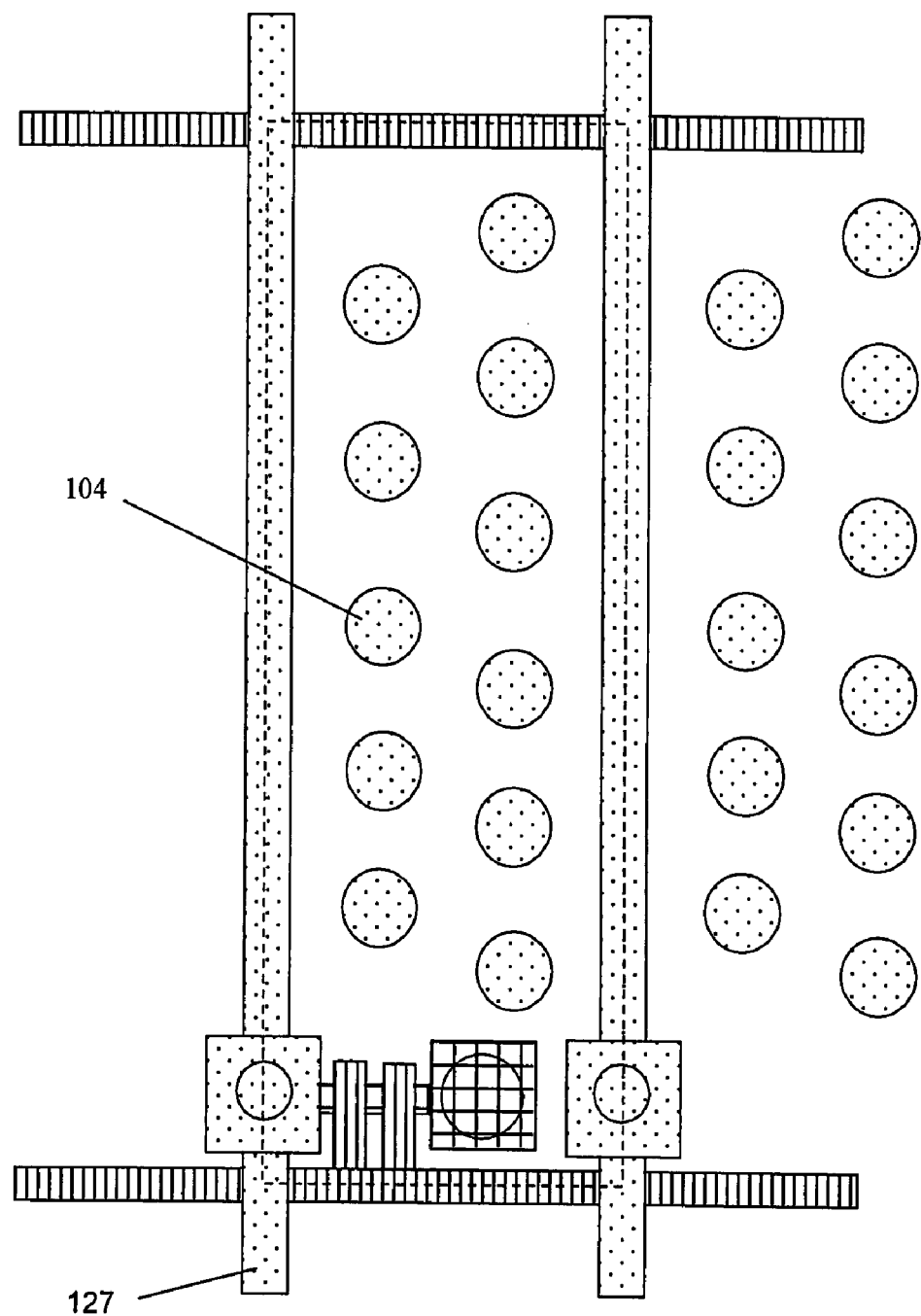
FIG. 8 is a plan view of an essential portion of the manufacturing process as explained in FIG. 5 and FIG. 6.
Figure 9:
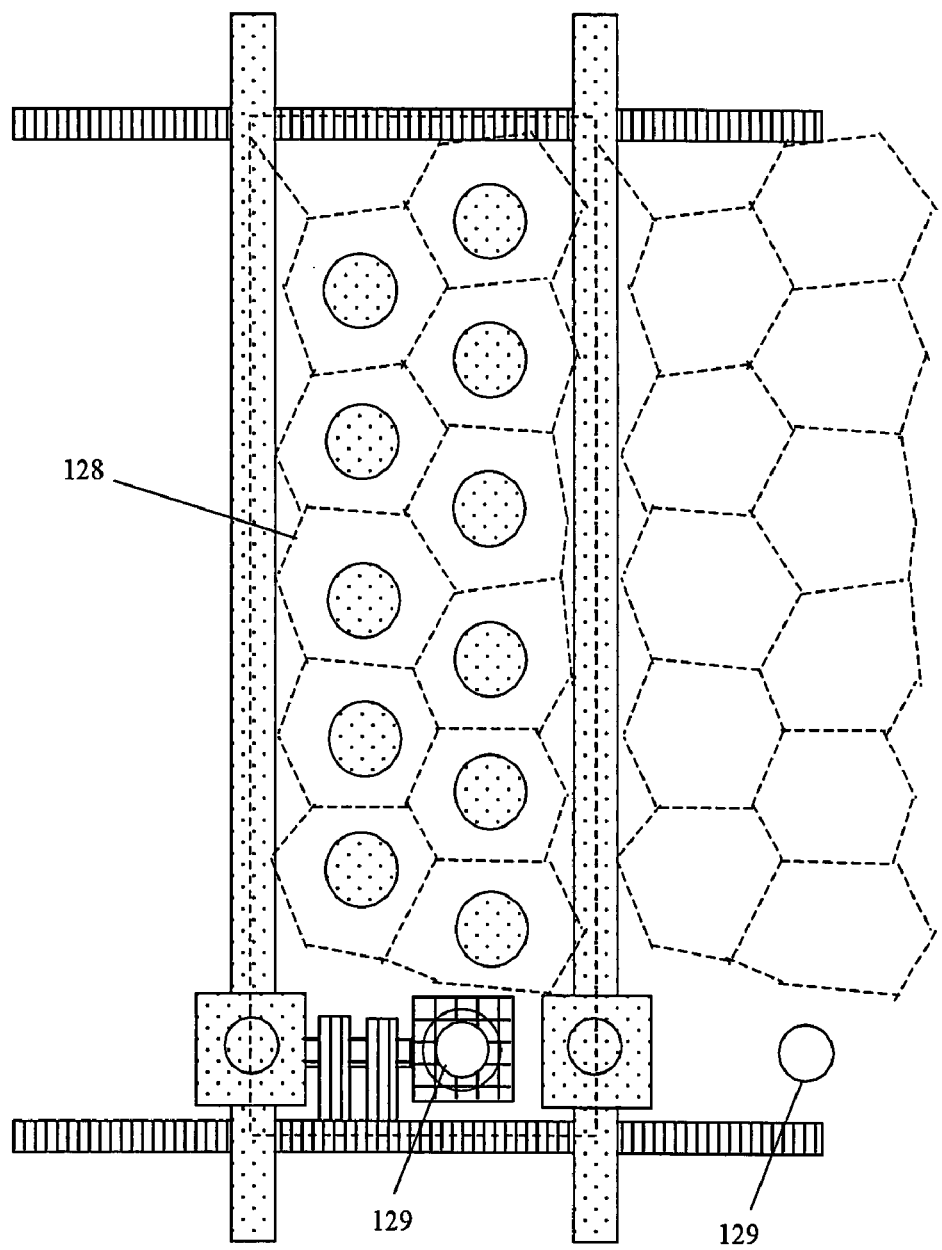
FIG. 9 is a plan view of an essential portion of the manufacturing process as explained in FIG. 5 and FIG. 6.
Figure 10:
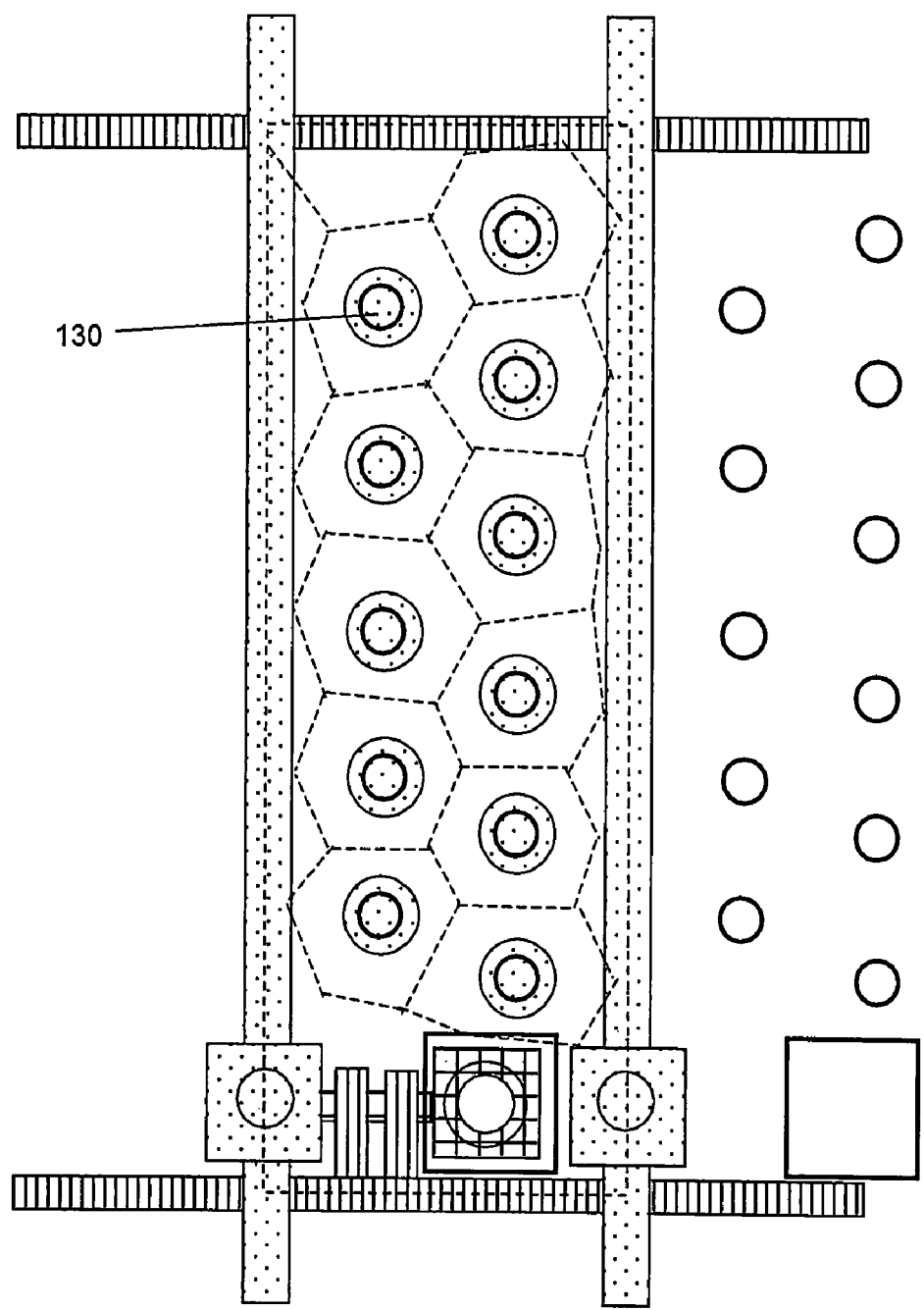
FIG. 10 is a plan view of an essential portion of the manufacturing process as explained in FIG. 5 and FIG. 6.
Figure 11:
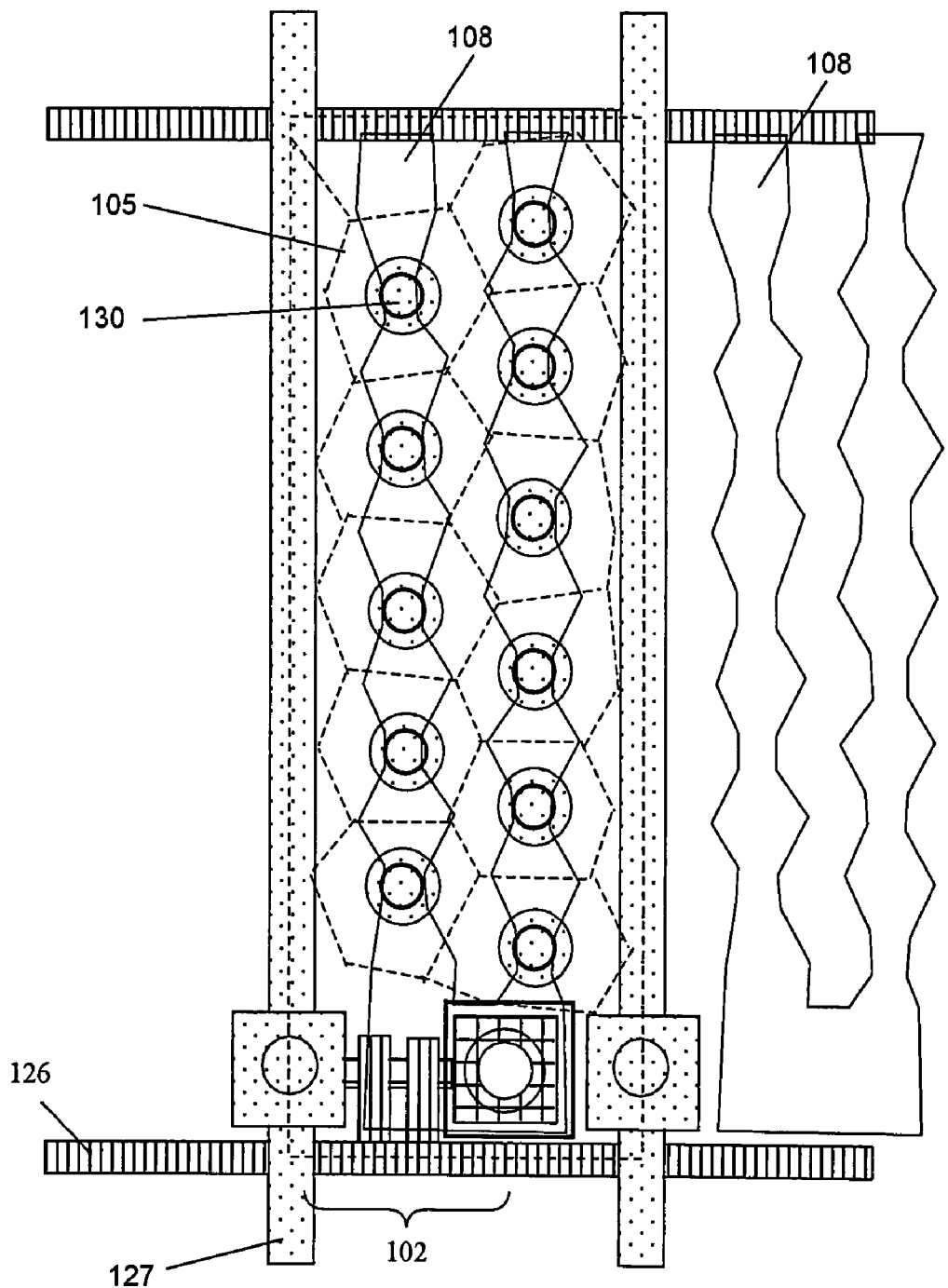
FIG. 11 is a plan view of an essential portion of the manufacturing process as explained in FIG. 5 and FIG. 6.

FIG. 5 to FIG. 11 each represents drawings to explain the manufacturing process of the Embodiment 1 of the transreflective type liquid crystal display unit shown in FIG. 1. FIG. 5 and FIG. 6 each represents cross-sectional views, and FIG. 7 to FIG. 11 each represents a plan view of an essential portion of the drawings of FIG. 5 and FIG. 6. In the Embodiment 1, description is given on an example to form a TFT substrate using polycrystalline silicon (Si), the so-called p-Si. First, a p-Si film 114, i.e. a semiconductor layer, is formed on the glass substrate 101 via an underlayer insulator film (underlayer film) 113, which is composed of laminated films of SiN and SiO (FIG. 5 (a)).

Then, a gate insulator film 125 made of SiO and a gate 124 comprising MoW alloy are prepared sequentially. After the film is deposited by sputtering, it is further processed by photolithographic process.

After the gate is prepared, an LDD 123 is formed, in which a source 116, a drain 115 and a low concentration dopant are injected by P-ion implantation. This is accomplished self aligned to the gate by using the gate and the resist mask in the processing of the gate as mask (FIG. 5 (b)). After depositing an interlayer insulator 118 comprising SiO film, a contact hole 119 is opened (FIG. 5 (c) and FIG. 7). A barrier film 120 made of MoW alloy and an aluminum alloy film 121 are prepared. This is further processed by photolithography, and a signal line 122 and a wiring layer reflective film 104, which is to serve as the second reflective film, are prepared (FIG. 5 (d) and FIG. 8).

An organic PAS film 106 is coated and partial exposure to light is performed by using a halftone mask. After developing and baking, surface roughness (convex and concave portions) 128 are formed on the surface. On the organic PAS film 106, a reflective common electrode 105 composed of aluminum alloy film is formed, and this is used as a first reflective film (FIG. 6 (a) and FIG. 10). A second organic PAS film 107 is prepared on the reflective common electrode. A transparent pixel electrode 108 made of ITO is disposed on it, and the TFT substrate 100 is formed. The wiring layer reflective film 104 has the upper layer made of aluminum alloy and the reflectivity is improved, but there is a problem in that contact resistance is increased when ITO, which is used in the transparent pixel electrode 108, comes into contact with the aluminum alloy. For this reason, the pixel electrode 108 is directly connected with a source electrode 116 of the TFT composed of p-Si film via a through-hole 129 on the organic PAS film 107 and via the contact hole 119 (FIG. 6 (b) and FIG. 11).

In the Embodiment 1, the liquid crystal 300 is rotated within a plane in parallel to the substrate by the electric field applied between the transparent pixel electrode 108 and the reflective common electrode 105. The transmissivities of the polarizers 111 and 205 are changed through modulation of the condition of polarization of the light, and an image is displayed. To attain the coordination of the characteristics between the reflecting region and the transmitting region, rotation angle of the liquid crystal is set to a larger value on the transmitting region than on the reflecting region. The width of electrode in the transmitting region, which serves as an opening of the common reflective electrode is set to a smaller width than that of the reflecting region (i.e. the other region) to give steeper inclination to the electric field, and rotation angle of the liquid crystal is made larger.

Embodiment 2

Figure 12:
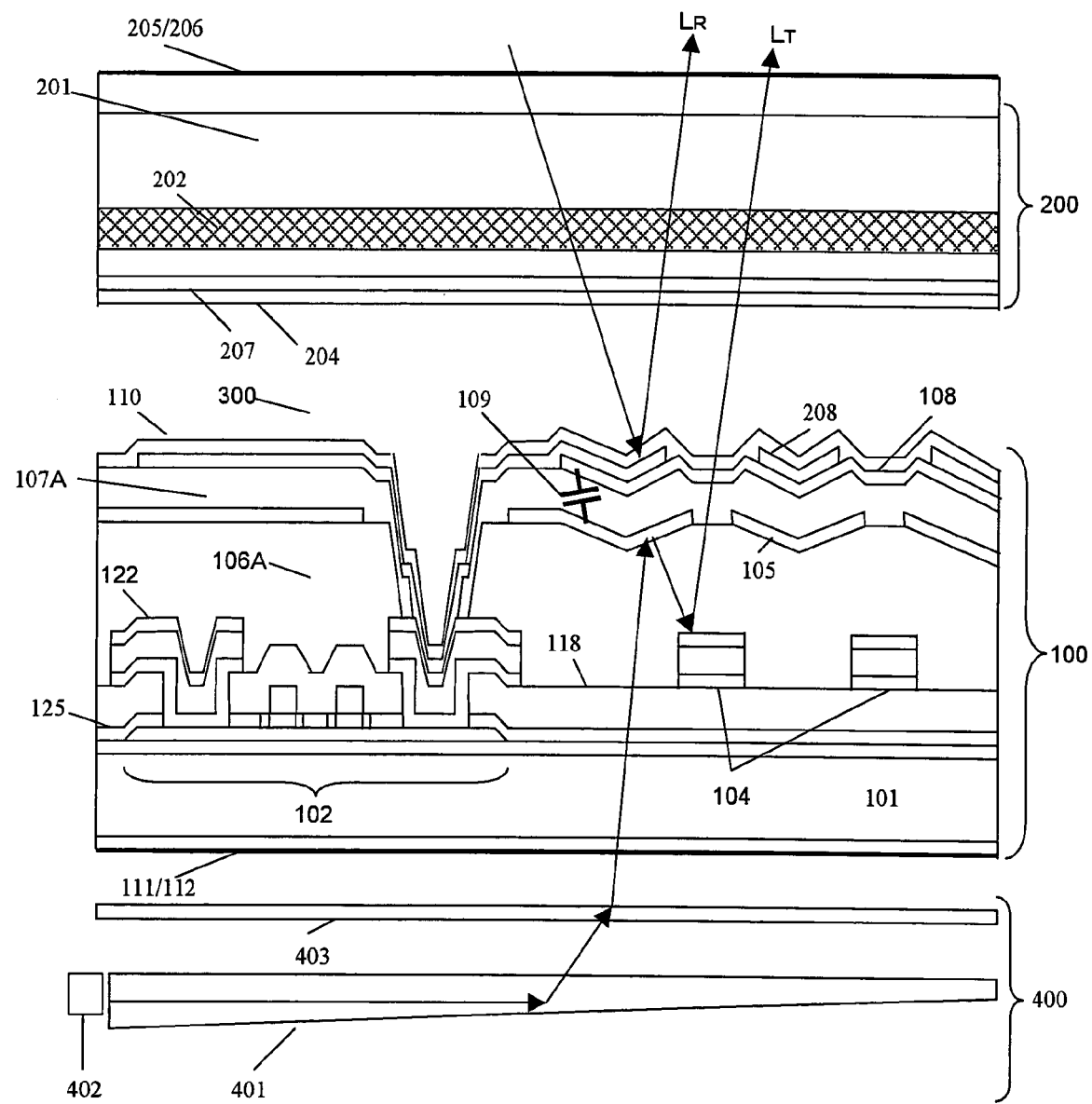
FIG. 12 is a cross-sectional view to explain the Embodiment 2 of the transreflective type liquid crystal display unit according to the present invention.

FIG. 12 is a cross-sectional view to explain the Embodiment 2 of the transreflective type liquid crystal display unit according to the present invention. In the Embodiment 2, the invention is applied to a transreflective liquid crystal display unit of longitudinal electric field type. In the Embodiment 2, the transparent pixel electrode 108 and the reflective pixel electrode 208 are disposed on the TFT substrate 100 via the reflective common electrode 105 to serve as the first reflective film, and via a capacity insulator film 107A made of SiN. Then, a storage capacitor 109 is arranged between the reflective common electrode 105 and these components (the transparent pixel electrode and the reflective pixel electrode 208). Openings are prepared on the reflective common electrode 105 and the reflective pixel electrode 208, and the wiring layer reflective film 104 to serve as the second reflective film is prepared underneath.

Surface roughness (convex and concave portions) are formed on the reflective pixel electrode 208 so that the external light is scattered and reflected and is turned to a reflection light $L_R$. A backlight beam is reflected by rear surface of the reflective common electrode 105. It is further reflected by the wiring layer reflective film 104 and is converged to the openings on the reflective common electrode 105 and the reflective pixel electrode 208 and is turned to a transmission light $L_T$.

In the Embodiment 2, the storage capacitor 109 is a combination of the transparent pixel electrode 108 and the reflective common electrode 105. It is disposed under the reflective pixel electrode 105 and does not interrupt the backlight beam and the external light. Thus, light utilization efficiency is increased. Also, there is no film other than the alignment film 110 between the reflective pixel electrode 208 and the liquid crystal 300, and high reflectivity is attained.

The liquid crystal display unit in the Embodiment 2 is the so-called vertical alignment type (VA). When no voltage is applied, molecules of the liquid crystal are oriented in a direction perpendicular to the surface of the substrate. When electric field is applied between the pixel electrode and the transparent counter electrode on the counter substrate, the direction of orientation of the molecules in the liquid crystal are inclined. As a result, condition of polarization of the light passing through the liquid crystal is modulated and the image is displayed. When voltage is not applied on the liquid crystal, both the transmitting light and the reflected light are shielded by the polarizer, and the normally-off condition is created. Upper and lower polarizers and the retardation film as well as the orientation of the liquid crystal are adjusted. In particular, when it is so arranged that the light entering the liquid crystal is to be a circularly polarized light, the display of black color is stabilized with respect to the thickness of the liquid crystal layer. As a result, higher contrast can be attained.

In the transmitting region, the transparent electrode is not opened, and only the reflective electrode is opened. Then, electric field is applied on the liquid crystal, which is in a gap with the counter electrode. On the region where the transparent pixel electrode and the reflective pixel electrode have openings, there are the points where the liquid crystal is not tilted, and the tilting of the liquid crystal in other points is stabilized due to the electric field applied between the common reflective electrode and the pixel electrode. The deviation of the characteristics of the transmitting region and the reflecting region is adjusted by shifting the opening on the reflective electrode, which is turned to the transmitting region, toward outer periphery of the pixel electrode. The other arrangement is almost the same as that of the Embodiment 1.

Figure 13A:
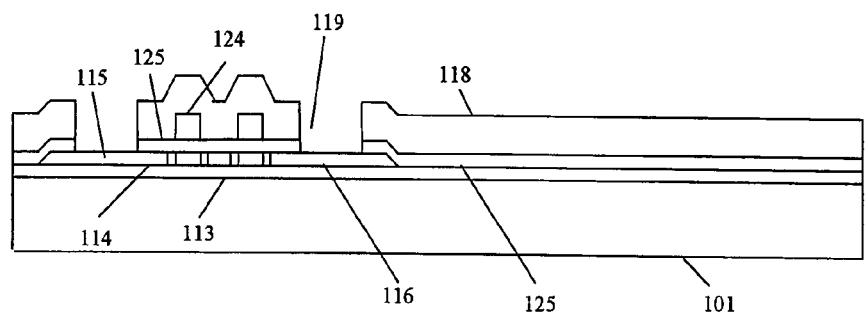
FIG. 13A through FIG. 13C are cross-sectional schematical views at various steps of the manufacturing process of the Embodiment 2 of the transreflective type liquid crystal display unit as shown in FIG. 12.
Figure 13B:
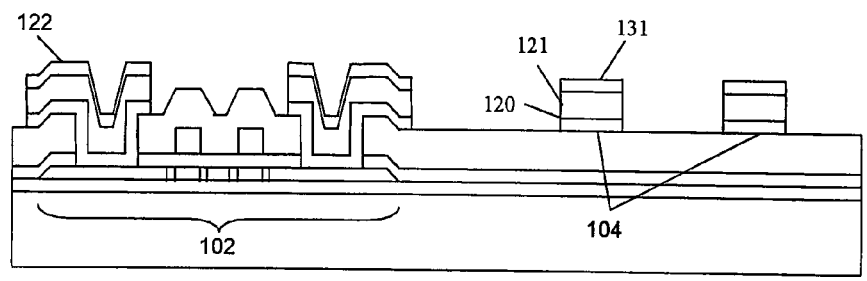
Figure 13C:
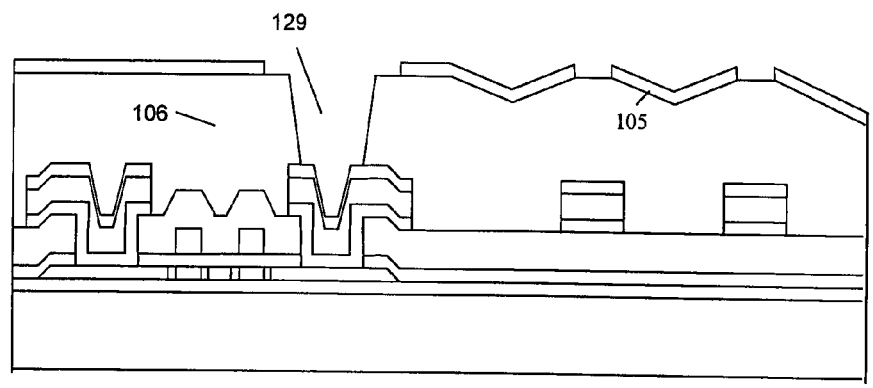
Figure 14A:
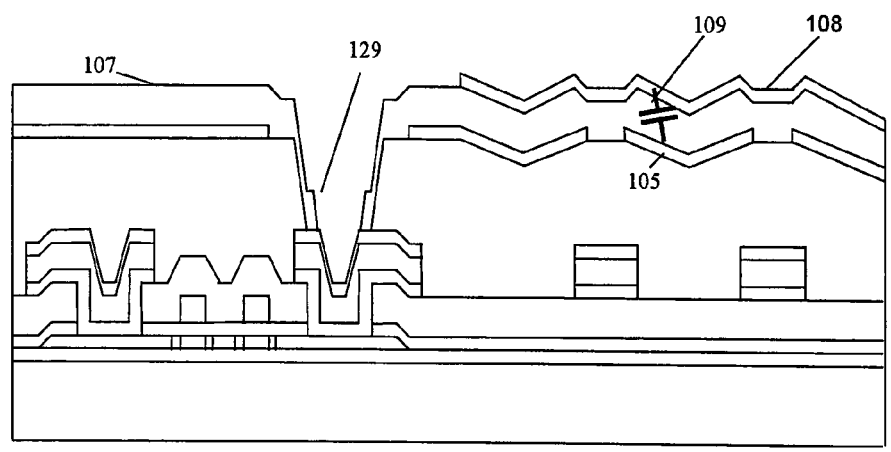
FIG. 14A and FIG. 14B are cross-sectional schematical views at various steps of the manufacturing process similar to FIG. 13 of the Embodiment 2 of the transreflective type liquid crystal display unit as shown in FIG. 12.
Figure 14B:
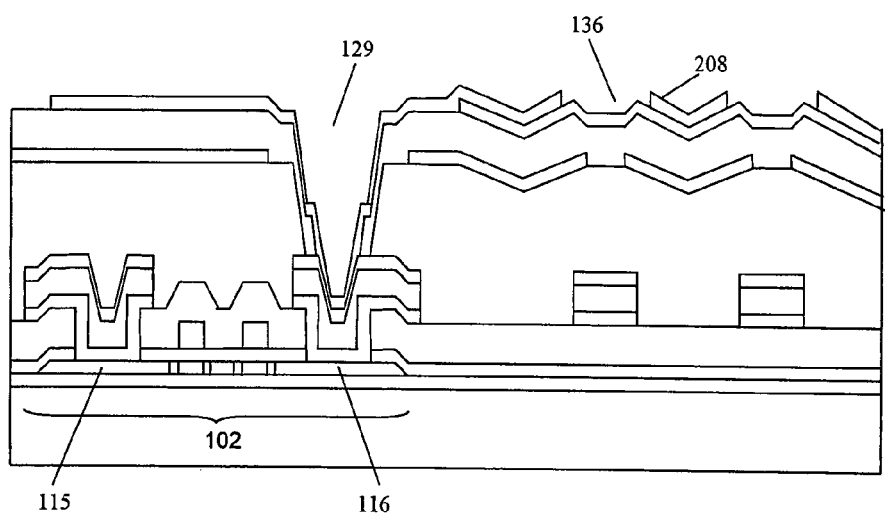
Figure 15:
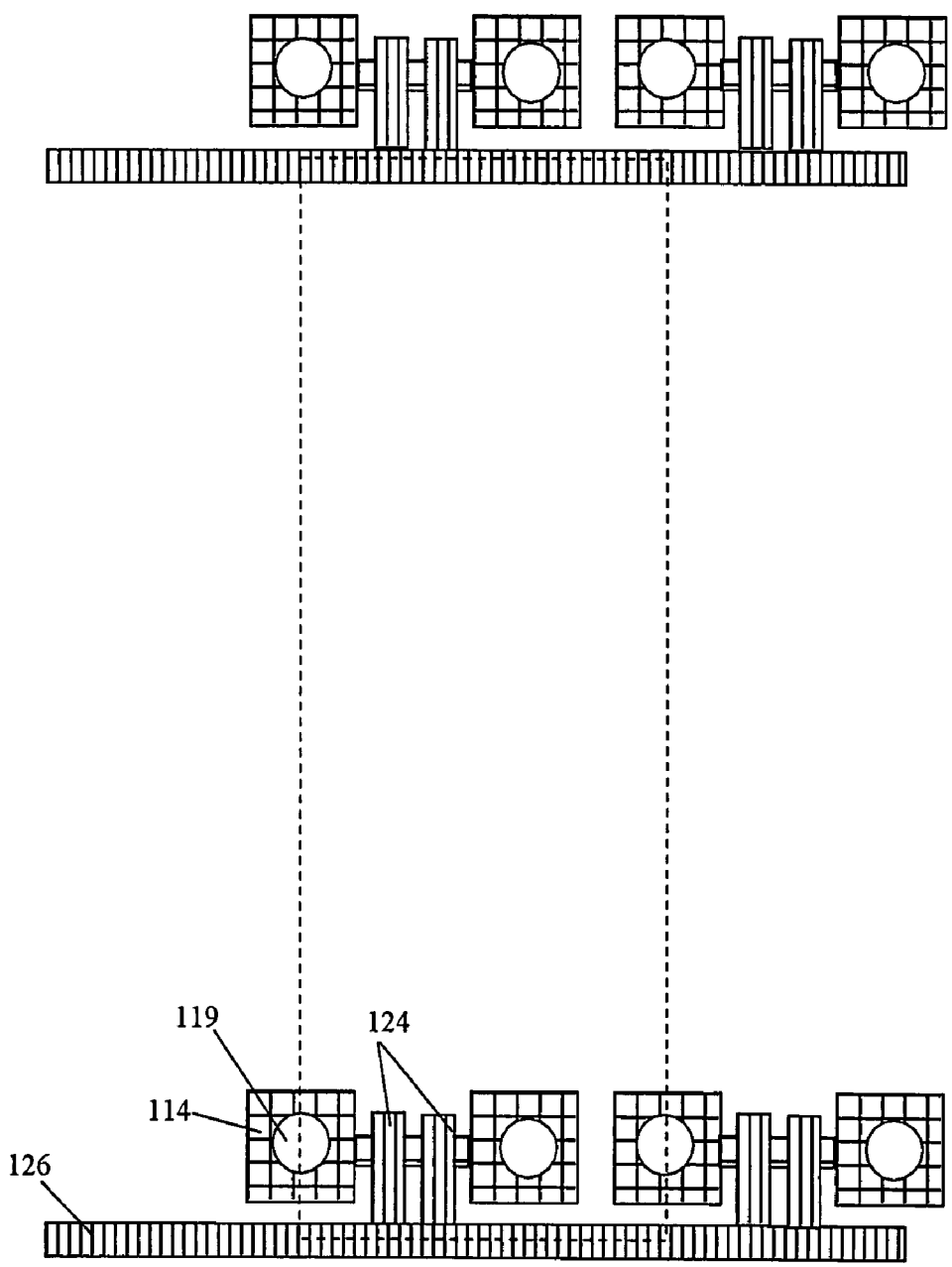
FIG. 15 is a plan view of an essential portion of the manufacturing process explained in connection with FIG. 13 and FIG. 14.
Figure 16:
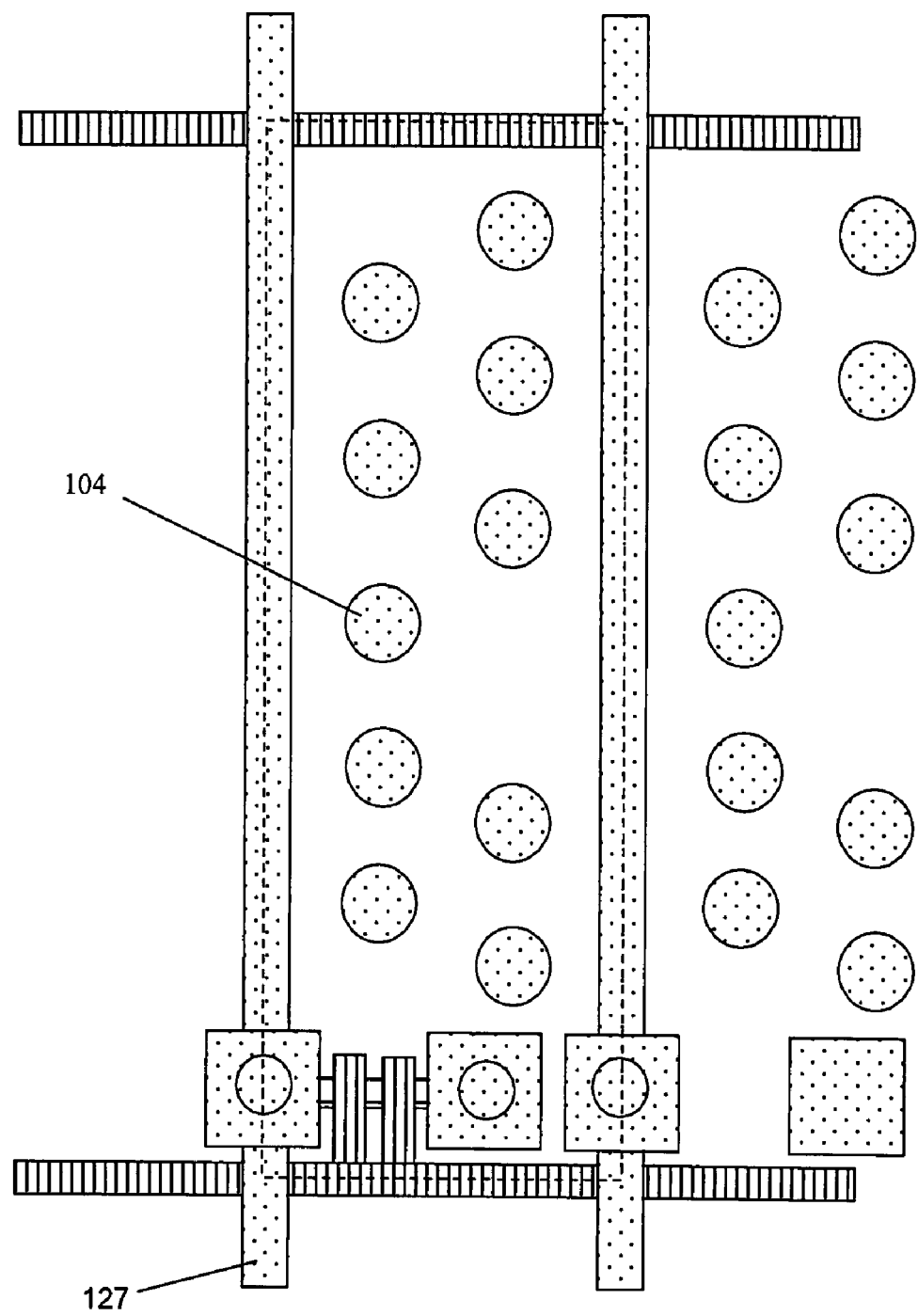
FIG. 16 is a plan view of an essential portion of the manufacturing process explained in connection with FIG. 13 and FIG. 14.

FIG. 13 to FIG. 20 each represents drawings to explain the manufacturing process of the Embodiment 2 of the transreflective type liquid crystal display unit shown in FIG. 12. FIG. 13 and FIG. 14 each represents cross-sectional views, and FIG. 15 to FIG. 20 each represents a plan view of an essential portion of the process shown in FIG. 13 and FIG. 14 respectively. Similarly to the example shown in FIG. 5, the Embodiment 2 shows an example of a process to prepare the TFT substrate. First, a p-Si film 114, a gate insulator film 125, a gate 124, a drain 115, a source 116, and an interlayer insulator film 118 made of SiO film are deposited, and a contact hole 119 is opened (FIG. 13 (a) and FIG. 15).

A barrier film 120 made of Mo, an aluminum alloy film 121 and an Ag alloy film 131 are laminated. By photolithographic process, a bus line 122 (a signal line 127) and a wiring layer reflective film 104 to serve as the second reflective film are prepared (FIG. 13 (b) and FIG. 16).

Figure 17:
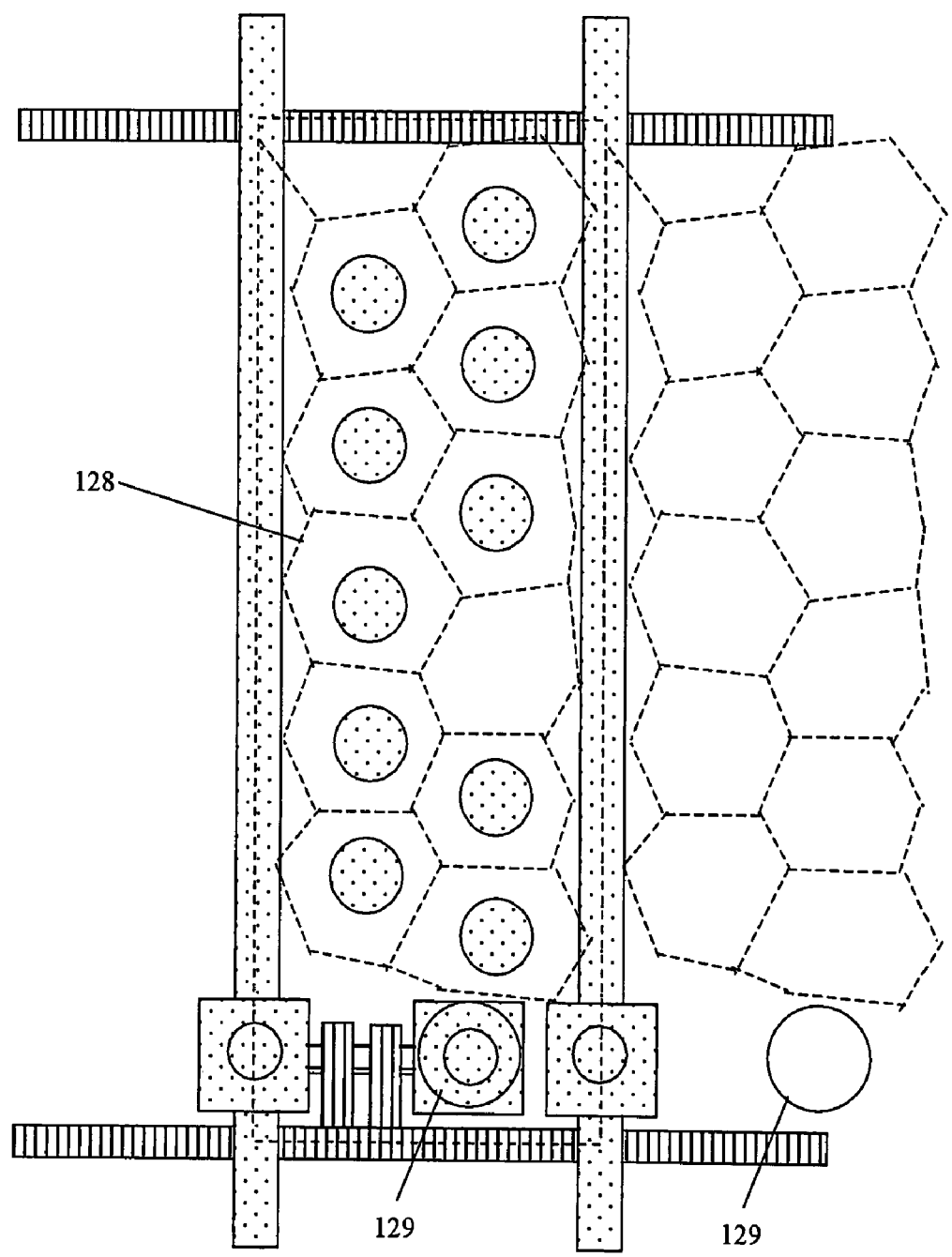
FIG. 17 is a plan view of an essential portion of the manufacturing process explained in connection with FIG. 13 and FIG. 14.
Figure 18:
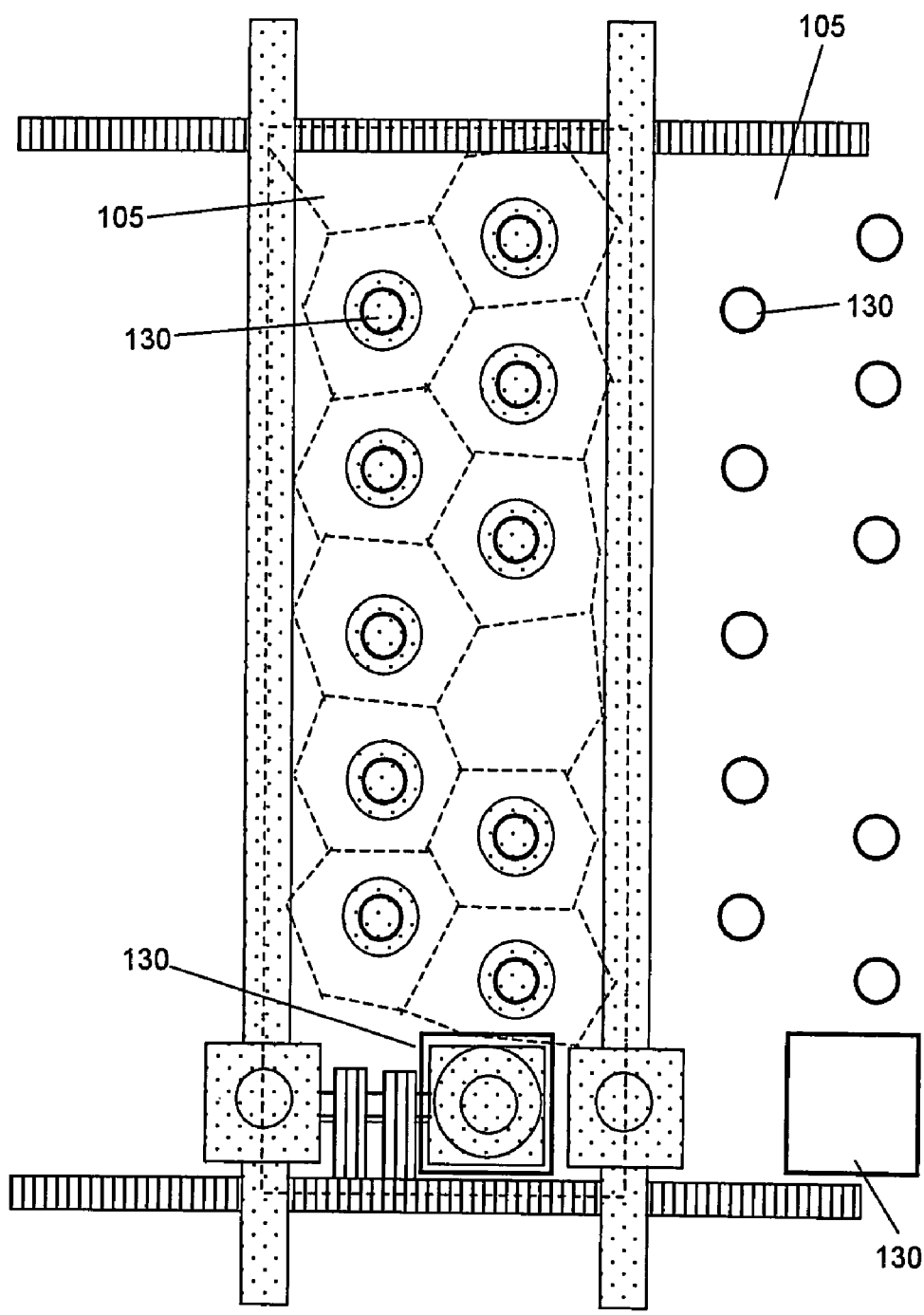
FIG. 18 is a plan view of an essential portion of the manufacturing process explained in connection with FIG. 13 and FIG. 14.
Figure 19:
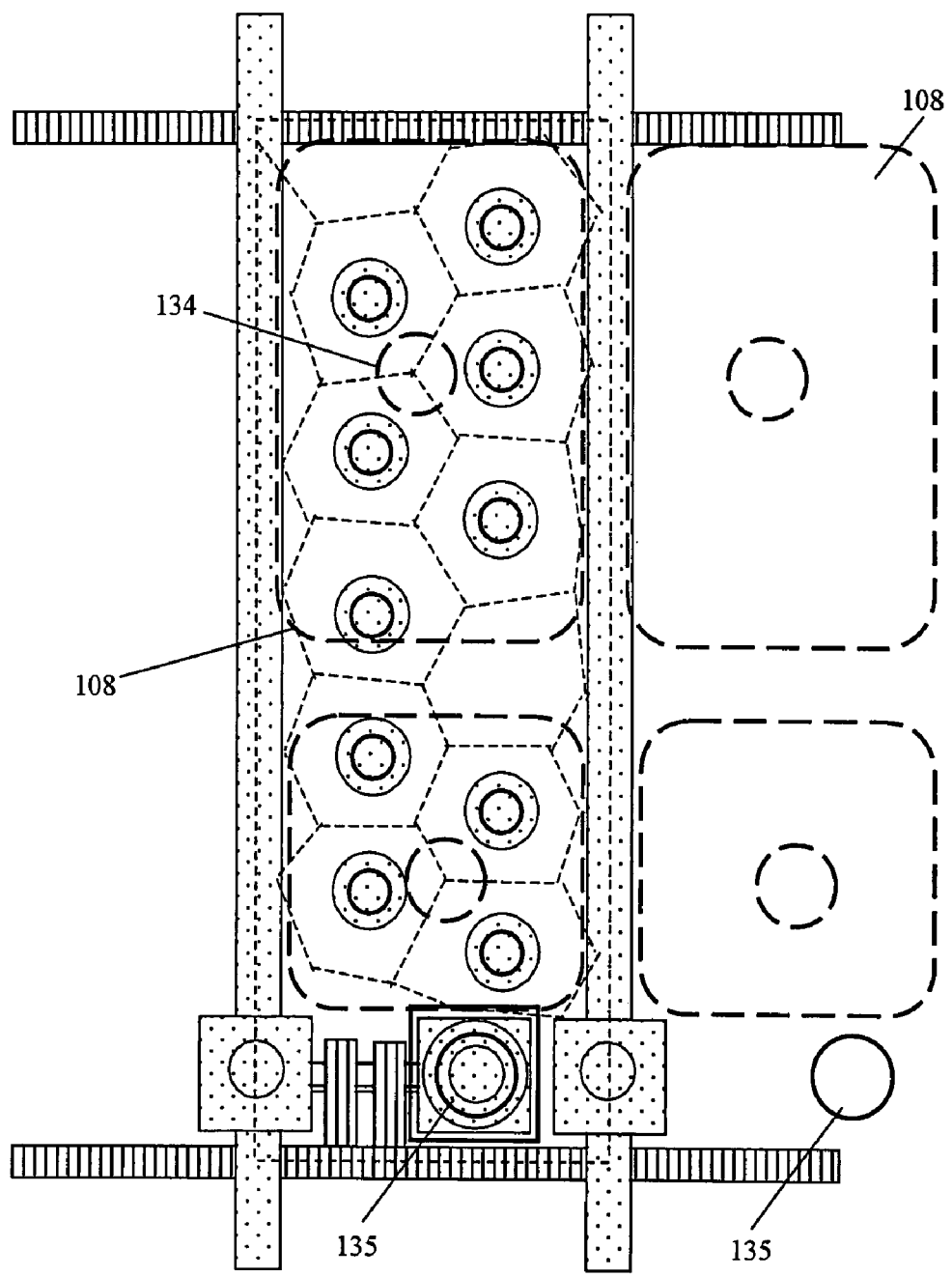
FIG. 19 is a plan view of an essential portion of the manufacturing process explained in connection with FIG. 13 and FIG. 14.
Figure 20:
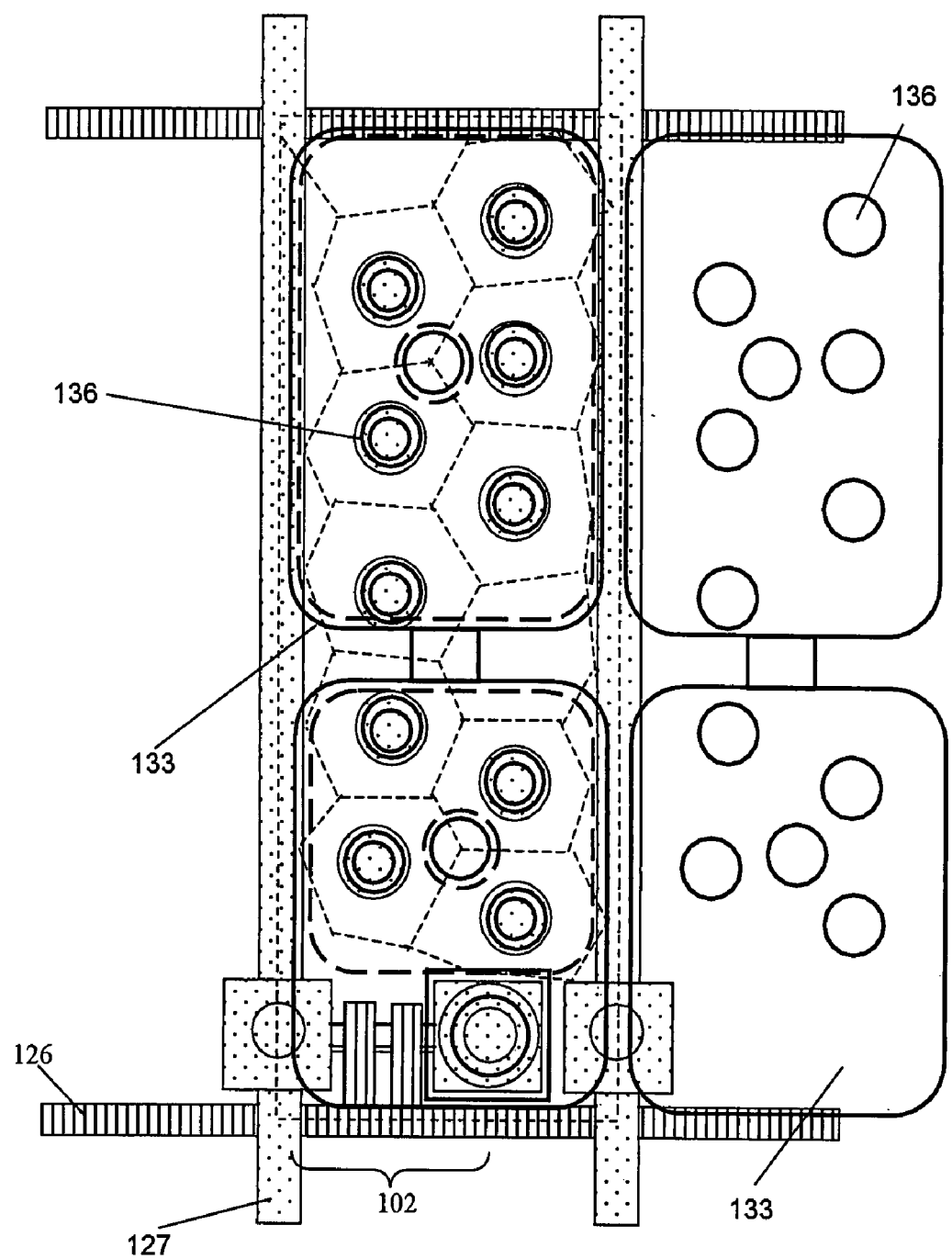
FIG. 20 is a plan view of an essential portion of the manufacturing process explained in connection with FIG. 13 and FIG. 14.

An organic PAS film 106 is coated, and partial exposure to light is performed by using a halftone mask. After developing and baking, surface roughness (convex and concave portions) 128 are formed on the surface (FIG. 17). The reflective common electrode 105 comprising a laminated film of an Ag alloy film and an aluminum alloy film is prepared, and this is used as the first reflective film (FIG. 13 (c) and FIG. 18).

A capacity insulator film 107 made of SiN is deposited by CVD on the reflective common electrode 105, and a through-hole 129 is opened by photolithographic process. Then, the transparent pixel electrode 108 made of ITO is deposited on it (FIG. 14 (a) and FIG. 19). The reflective pixel electrode 208 is prepared on it, and the TFT substrate is obtained. The transparent pixel electrode is connected to the source 116 of the TFT via the contact hole 119 (FIG. 13 (a)) and the through-hole 129 (FIG. 14 (b) and FIG. 20).

The lower layer of the first reflective film (the reflective common electrode 105) and upper layers of the wiring layer reflective film 104 and the reflective pixel electrode 208 are made of Ag alloy to have high reflectivity. There is a problem that contact resistance is increased when ITO of the transparent pixel electrode 108 is brought into contact with aluminum alloy, and a contact layer made of Mo is laminated on lower portion of the reflective pixel electrode 208. The manufacturing process can be simplified by preparing the reflective common electrode 105, the wiring layer reflective film 104 and the reflective pixel electrode 208 by wet etching.

Figure 21:
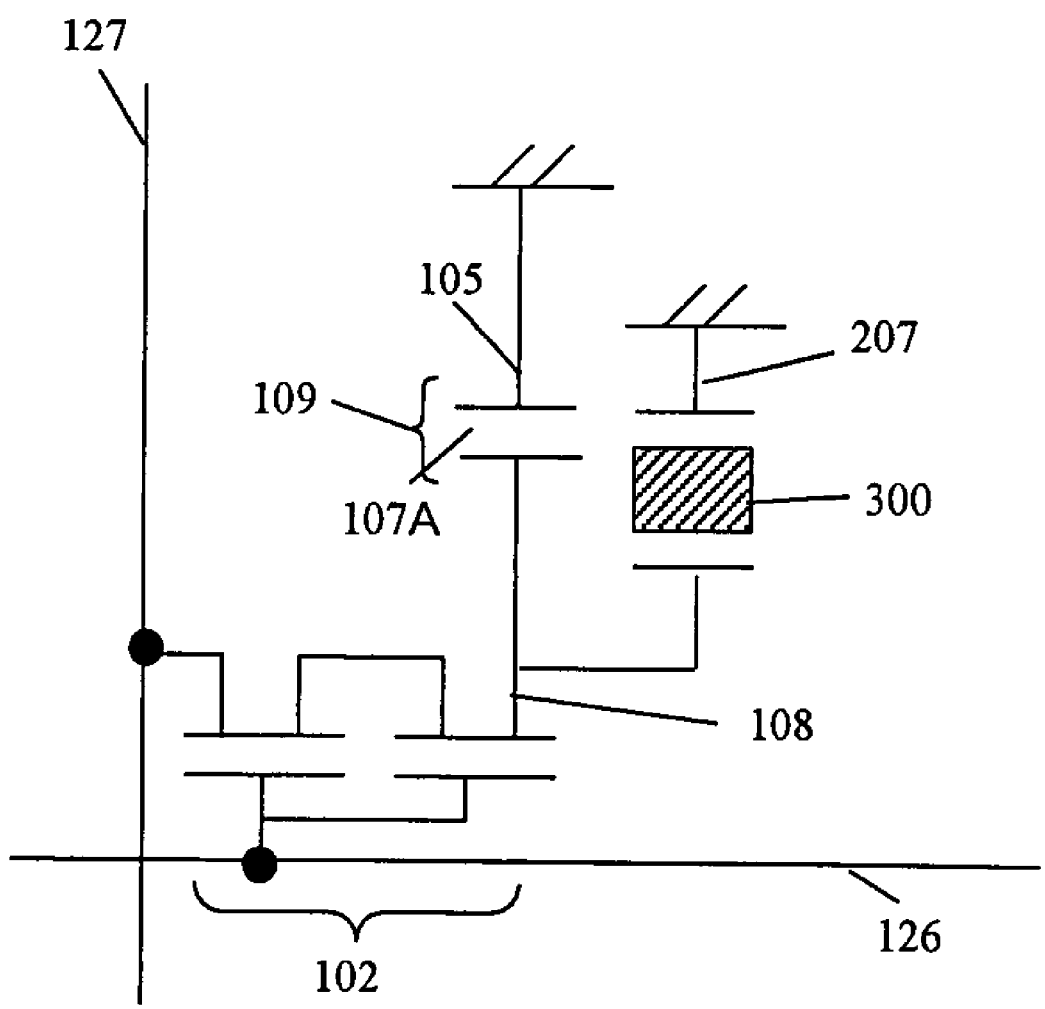
FIG. 21 is an equivalent circuit diagram of a pixel region in the Embodiment 2 of the invention.

FIG. 21 is an equivalent circuit diagram of the pixel region in the Embodiment 2 of the invention. The voltage applied on the transparent pixel electrode 108 is maintained at a constant level by the storage capacitor 109 arranged between the transparent pixel electrode 108 and the reflective common electrode 105 via the capacity insulator film 107A after the voltage is turned off on the TFT 102, and the voltage is applied on the liquid crystal 300. In the Embodiment 2, SiN with high dielectric is used as the capacity insulator film 107A. The storage capacitor 109 can be maintained at high level, and this contributes to the attainment of higher image quality.

Embodiment 3

Figure 22:
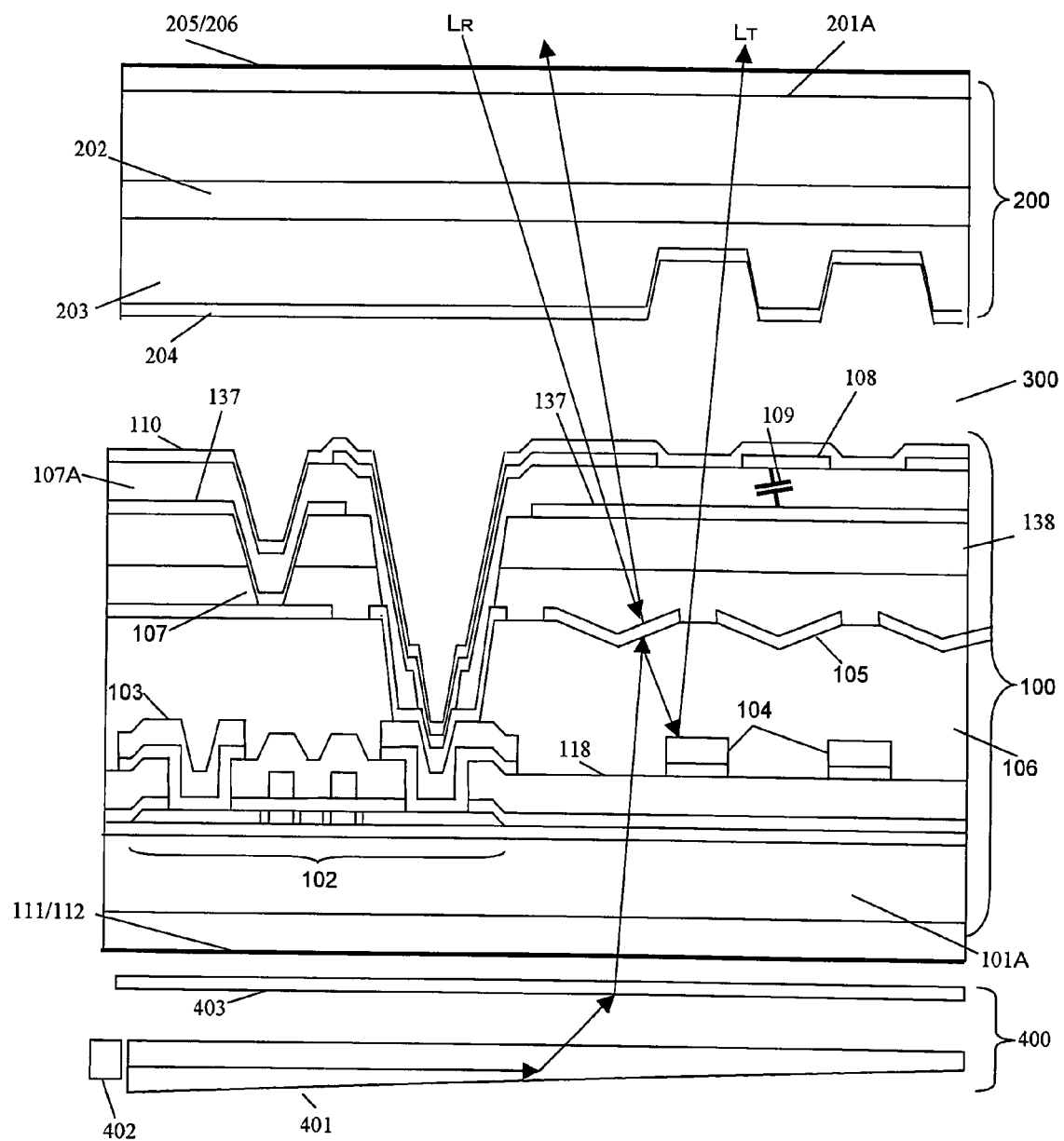
FIG. 22 is a cross-sectional view to explain the Embodiment 3 of the transreflective type liquid crystal display unit of the present invention.

FIG. 22 is a cross-sectional view of the Embodiment 3 of the transreflective type liquid crystal display unit of the present invention. In the Embodiment 3, the invention is applied to another transverse electric field type liquid crystal display unit, which is different from the explained in the Embodiment 1. In FIG. 22, a common reflective electrode 105 to serve as a first reflective film and a wiring layer reflective film 104 to serve as a second reflective film are prepared on the TFT substrate 100. A transparent common electrode 137 is provided on the common reflective electrode 105 via a retardation film 138, and a transparent pixel electrode 108 is prepared on the transparent common electrode 137 via the capacity insulator film 107A made of SiN.

A light beam from the backlight 400 is reflected by the common reflective electrode 105 and the wiring layer reflective film 104 of the counter substrate 200. The light is then converged to the opening on the common reflective electrode 105 and it is turned to a transmitting light $L_T$. The external light enters the common reflective electrode 105 via the polarizer 205, the retardation film 206, the color filter (CF) 202, the liquid crystal 300, and the retardation film 138 and is scattered and is reflected toward the counter substrate 200, and it is turned to a reflected light $L_R$. The other arrangement is almost the same as the one explained in the Embodiment 1.

In the Embodiment 3, the storage capacitor 109 is disposed on the common reflective electrode 105, which is to serve as the first reflective film, via the capacitor insulator film 107A between the transparent pixel electrode 108 and the transparent common electrode 137. As a result, the external light and the backlight beam are not interrupted, and this contributes to the improvement of light utilization efficiency.

Figure 23A:
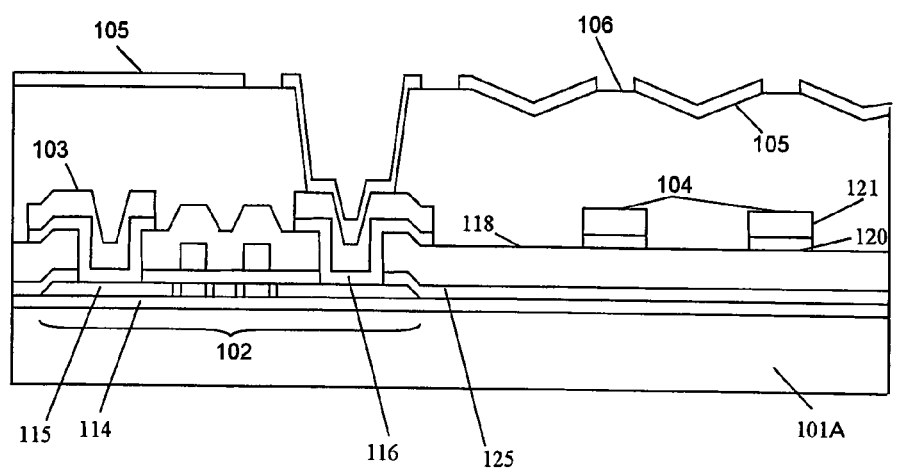
FIG. 23A and FIG. 23B are cross-sectional schematical views at various steps of the manufacturing process of the transreflective type liquid crystal display unit of the Embodiment 3 of the invention as shown in FIG. 22.
Figure 23B:
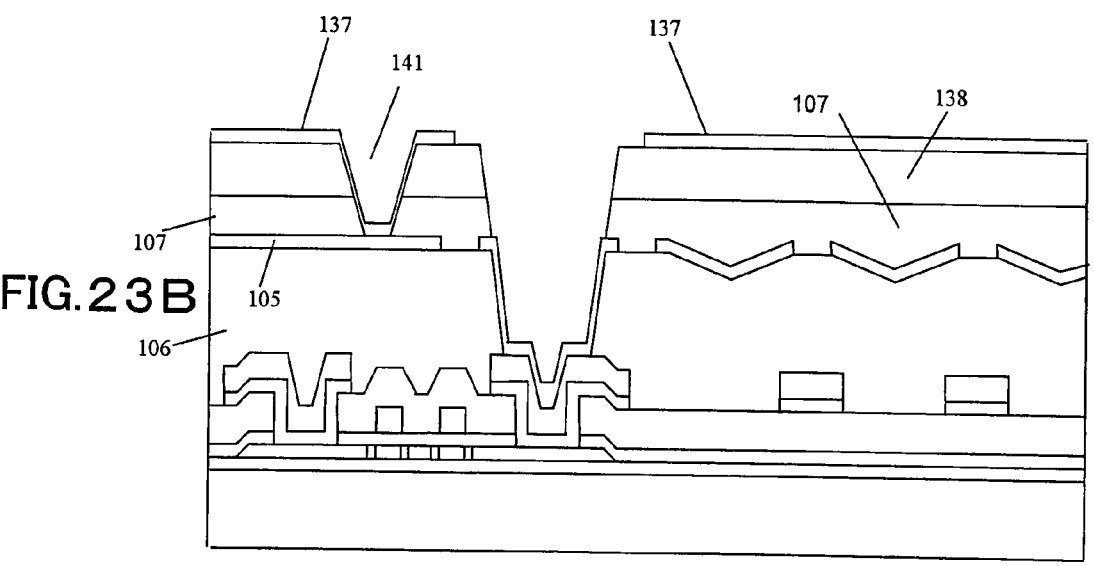
Figure 24A:
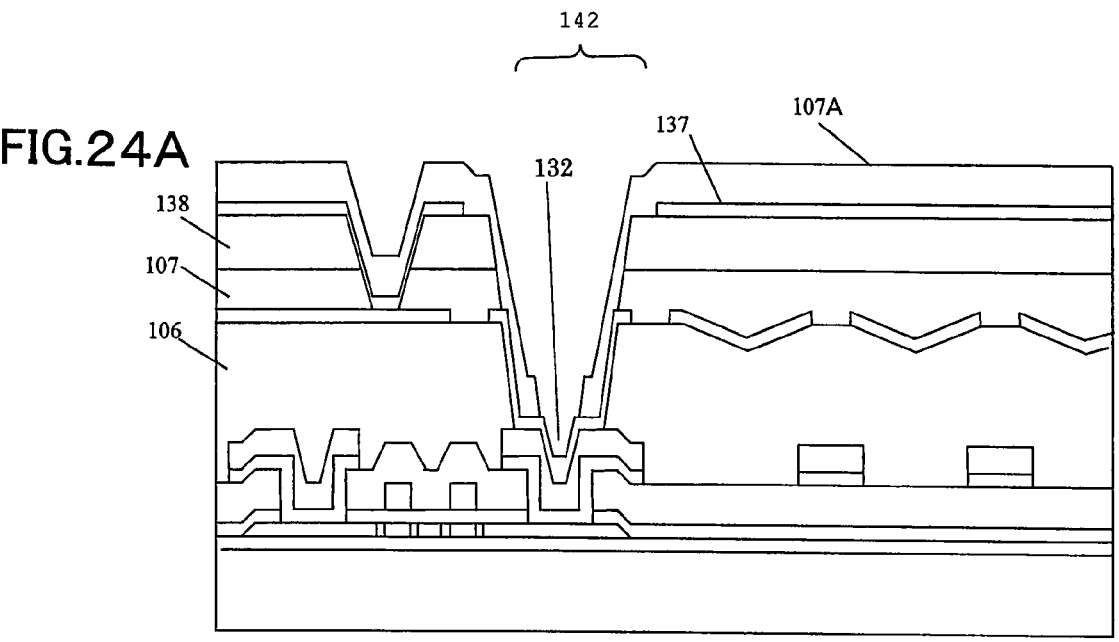
FIG. 24A and FIG. 24B are cross-sectional schematical views at various steps of the manufacturing process similar to FIG. 23 of the transreflective type liquid crystal display unit of the Embodiment 3 of the invention as shown in FIG. 22.
Figure 24B:
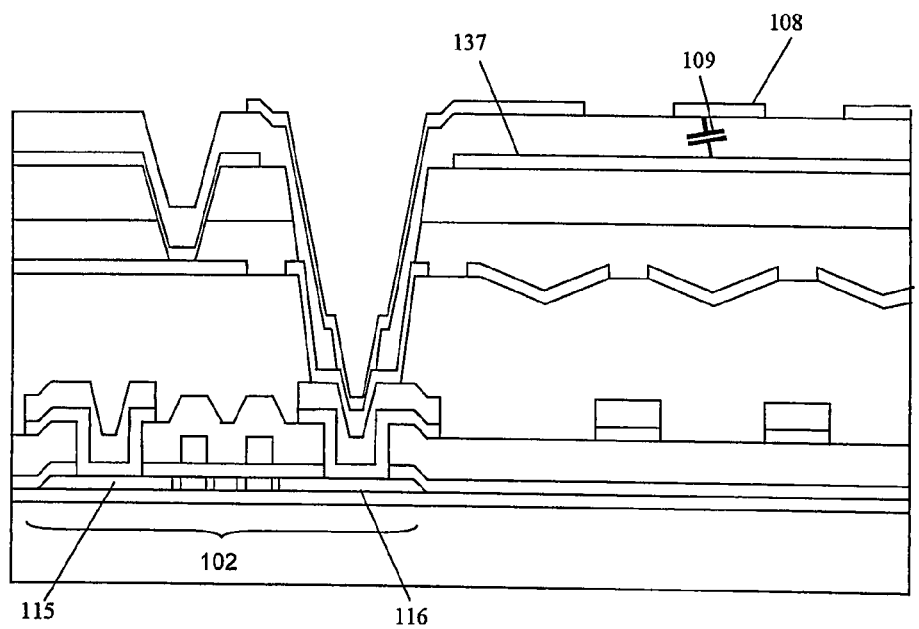
Figure 25:
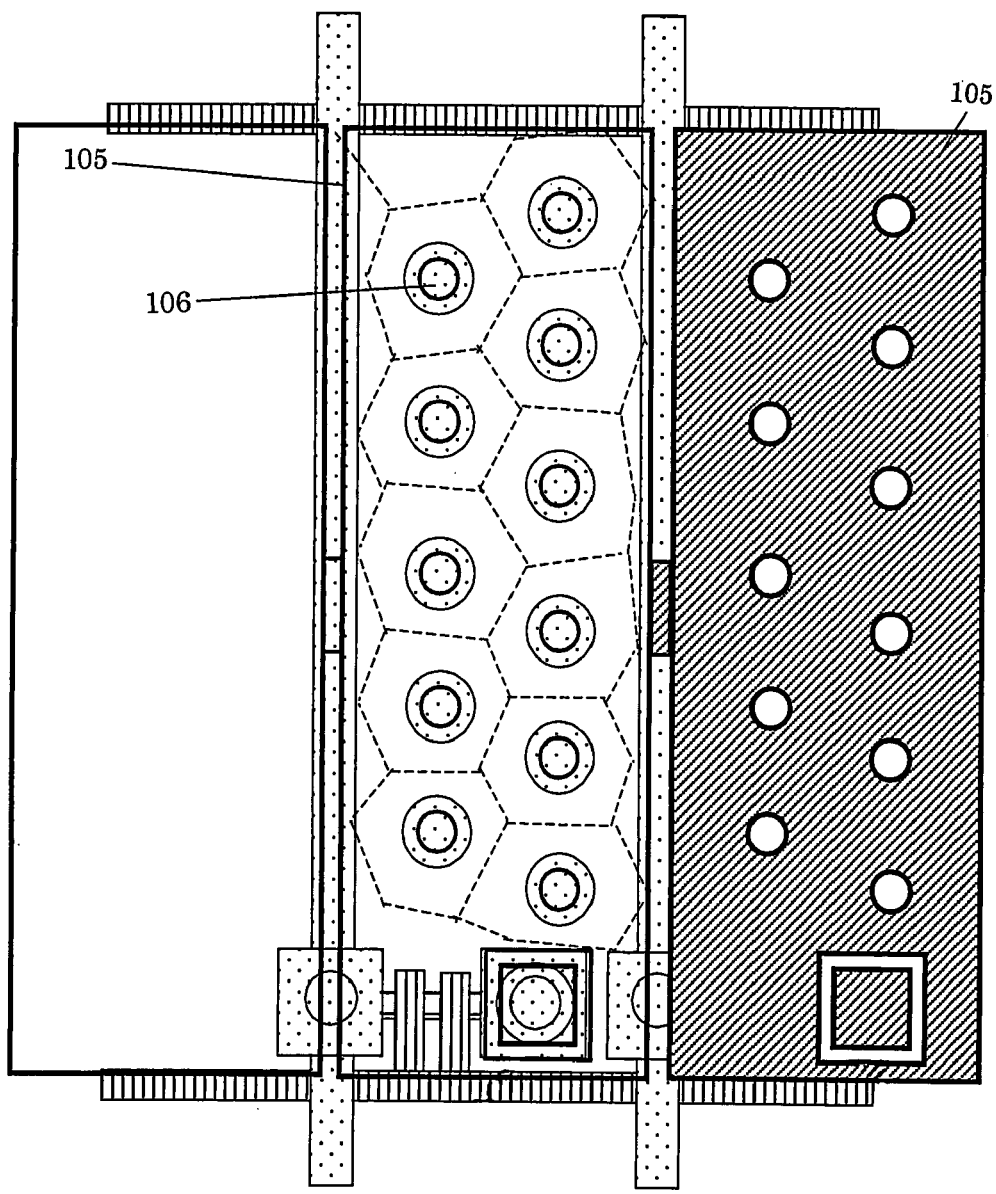
FIG. 25 is a plan view of an essential portion of the manufacturing process as explained in connection with FIG. 23 and FIG. 24.
Figure 26:
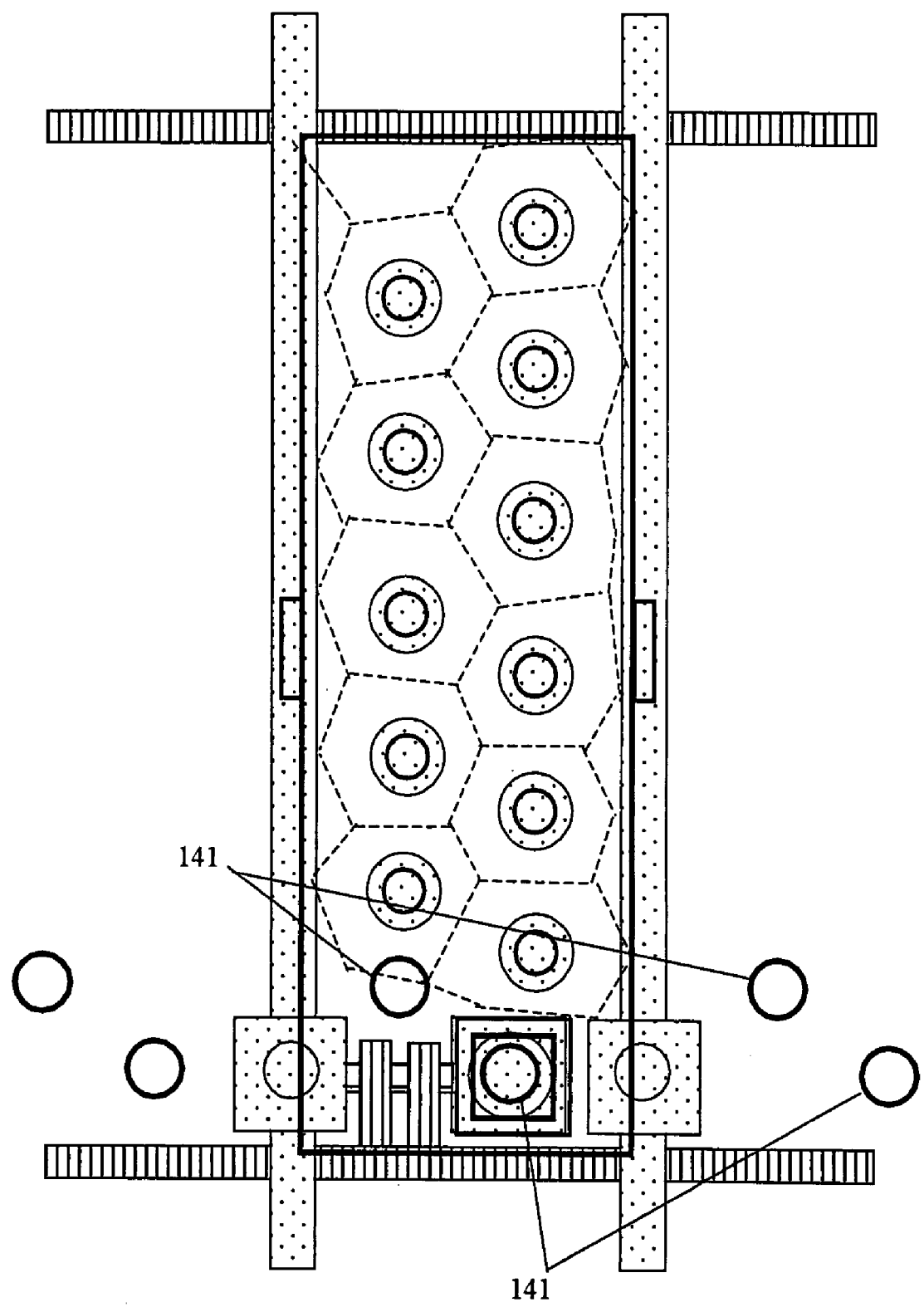
FIG. 26 is a plan view of an essential portion of the manufacturing process as explained in connection with FIG. 23 and FIG. 24.
Figure 27:
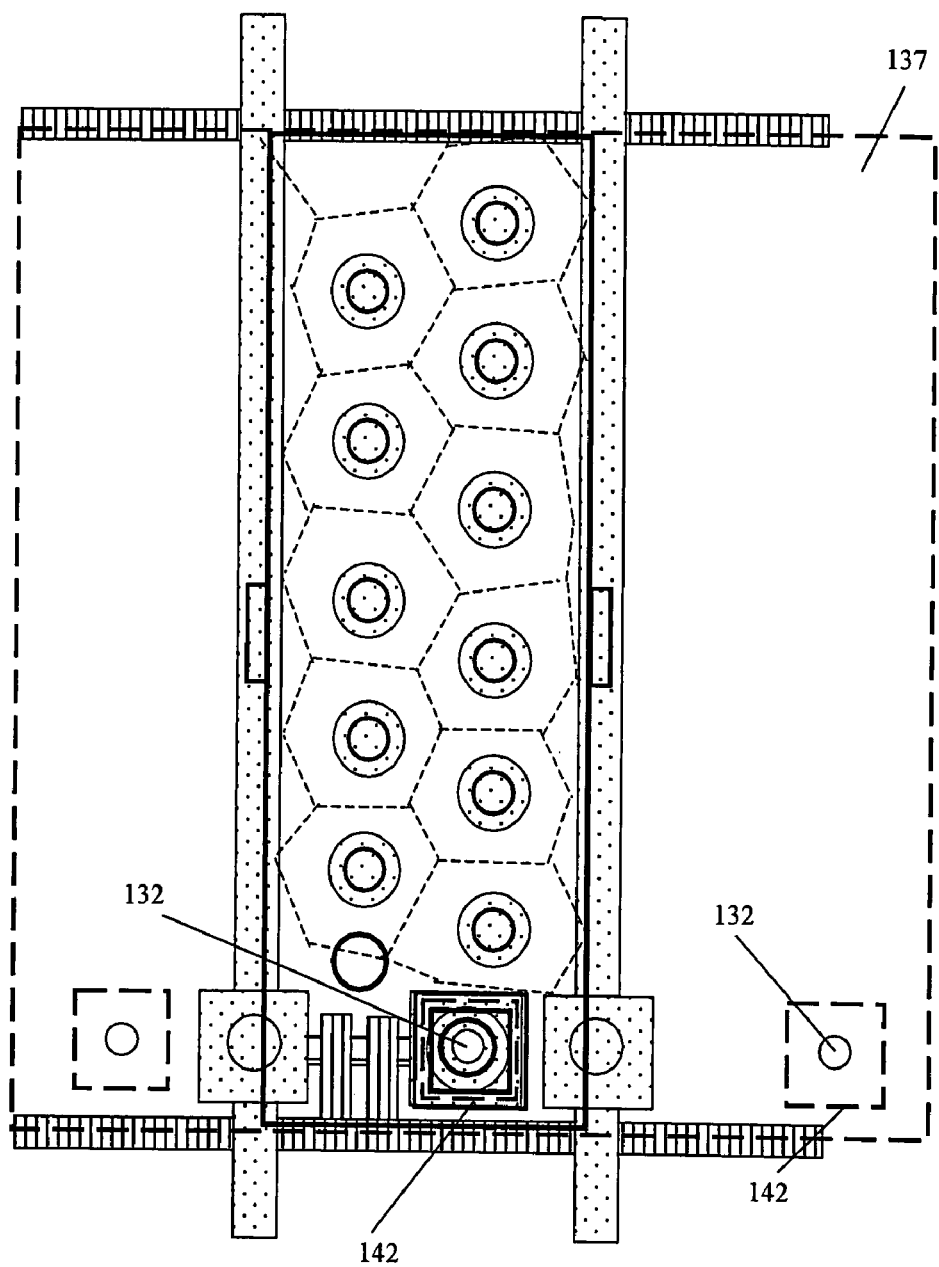
FIG. 27 is a plan view of an essential portion of the manufacturing process as explained in connection with FIG. 23 and FIG. 24.
Figure 28:
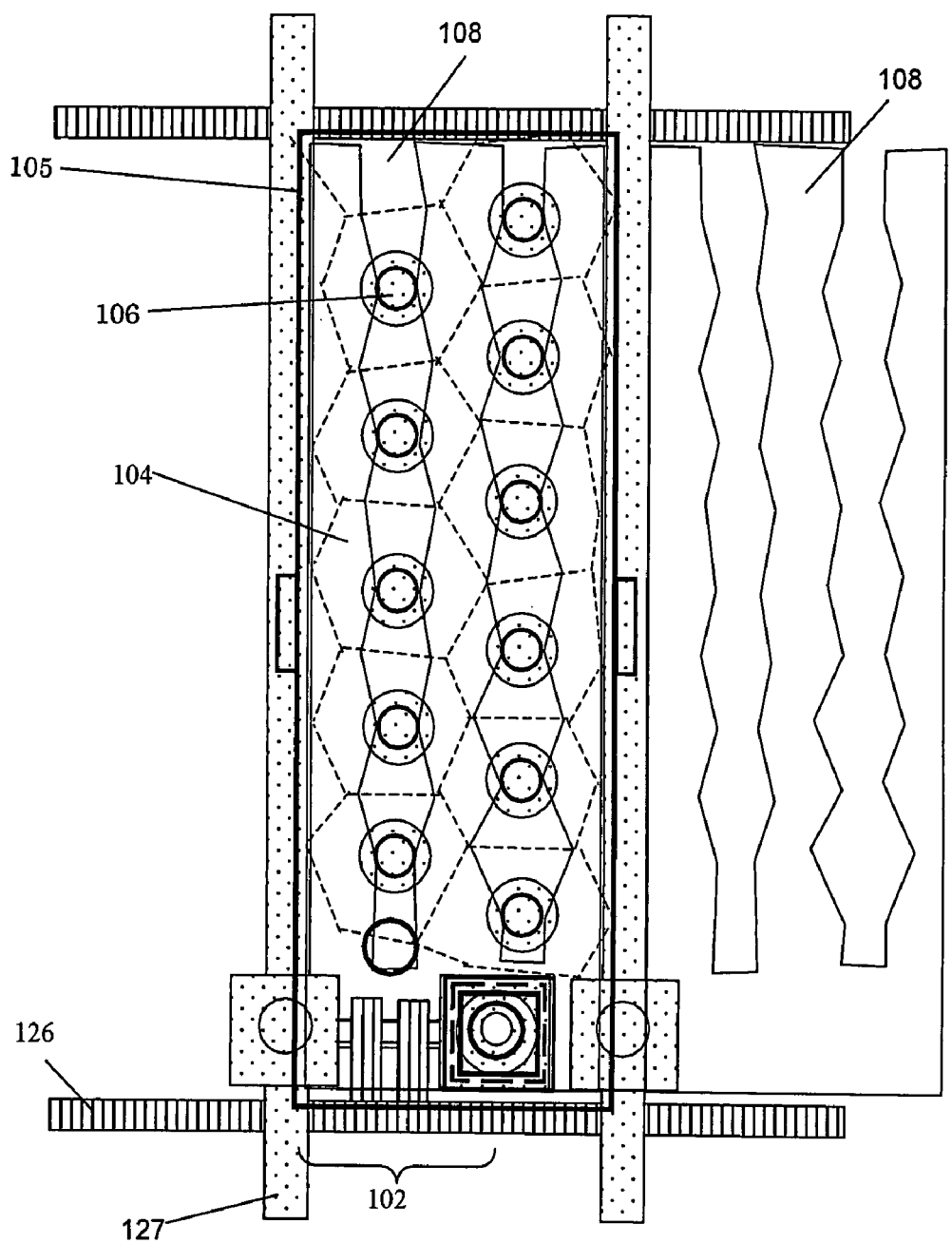
FIG. 28 is a plan view of an essential portion of the manufacturing process as explained in connection with FIG. 23 and FIG. 24.

FIG. 23 to FIG. 28 each represents drawings to explain the manufacturing process of the transreflective type liquid crystal display unit of the Embodiment 3 of the invention as shown in FIG. 22. FIG. 23 and FIG. 24 each represents cross-sectional views, and FIG. 25 to FIG. 28 each represents a plan view of an essential portion of the process shown in FIG. 23 and FIG. 24. Similarly to the Embodiments as given above, the Embodiment 3 shows an example of a process to prepare a TFT substrate. First, a p-Si film 114, a gate insulator film 125, a gate 124, a drain 115, a source 116, and an interlayer insulator film 118 made of SiO film are deposited, and a contact hole is opened. A barrier film 120 made of Mo and an aluminum alloy film 121 are laminated. After performing the photolithographic process, a signal line 103 and a wiring layer reflective film 104 to serve the second reflective film are prepared.

An organic PAS film 106 is coated, and partial exposure to light is performed by using a halftone mask. After developing and baking, surface roughness (convex and concave portions) are formed. A reflective common electrode 105 made of Ag alloy film is prepared on the organic PAS film 106, and this is used as the first reflective film. On the aluminum alloy film with the contact hole opened on it, an Ag alloy film is prepared (FIG. 23 (a) and FIG. 25).

A planarization film 107 is coated on the reflective common electrode 105, and a retardation film 138 is further coated on it. Then, a polarized ultraviolet light is projected, and the retardation film 138 and the organic PAS film 107 are exposed to the light. After developing, the non-exposed portion is opened. The retardation film 138 contains liquid crystal, which is turned to anisotropy by the polarized UV light, and a UV cure resin with chiral dopant added to it. The UV cure resin not containing these can be used as the planarization film 107.

The planarization film 107 maintains the film thickness of the retardation film 138 prepared on it to a constant level and equalizes the phase difference. By performing comprehensive light exposure of the planarization film and the retardation film, the manufacturing process can be simplified. A transparent common electrode 137 is prepared on the retardation film 138 (FIG. 23 (b) and FIG. 26). The transparent common electrode 137 is connected to the reflective common electrode 105 via the openings 141 on the retardation film 138 and the planarization film 107 (FIG. 24 (a) and FIG. 27).

A capacity insulator film 107A made of SiN is arranged on the transparent common electrode 137, and a through-hole 132 is opened by photolithographic process inside the opening 142 of the transparent common electrode 137. The transparent pixel electrode 108 made of ITO is deposited on it, and a TFT substrate 100 is obtained. The transparent pixel electrode 108 is connected to the source 116 of the TFT via the contact hole and the through-hole (FIG. 24 (b) and FIG. 28). The reflective common electrode 105 to serve the first reflective film is made of Ag alloy, which shows good contact performance with ITO and has high reflectivity. The first reflective film made of Ag alloy is also laminated on the aluminum alloy film in the contact hole to improve the contact performance with the pixel electrode 108, which is made of ITO.

In the Embodiment 3, by the electric field applied between the transparent pixel electrode 108 and the transparent common electrode 137, molecules of the liquid crystal are rotated within the plane of the substrate surface. The transmittance of the polarizer is changed by modulating the condition of polarization of the light, and the image is displayed. To adjust the characteristics of the reflecting region with those of the transmitting region, rotation angle of the liquid crystal is set to a value larger than that of the reflecting region. At the transmitting region to serve as the opening of the common reflective electrode 105, width of the opening of the transparent electrode 108 is set to a smaller value to give steep inclination to the electric field so that rotation angle of the liquid crystal will be larger. Similarly, to coordinate and adapt the characteristics of the reflecting region with those of the transmitting region, a concave portion 203A is provided on the protective film 203 of the counter substrate 200 to match the transmitting region, and the layer thickness of the liquid crystal 300 is set to a value larger than that of the reflecting region. The protective film 203 is a transparent insulator film, which also has the function as a smooth layer.

Figure 29:
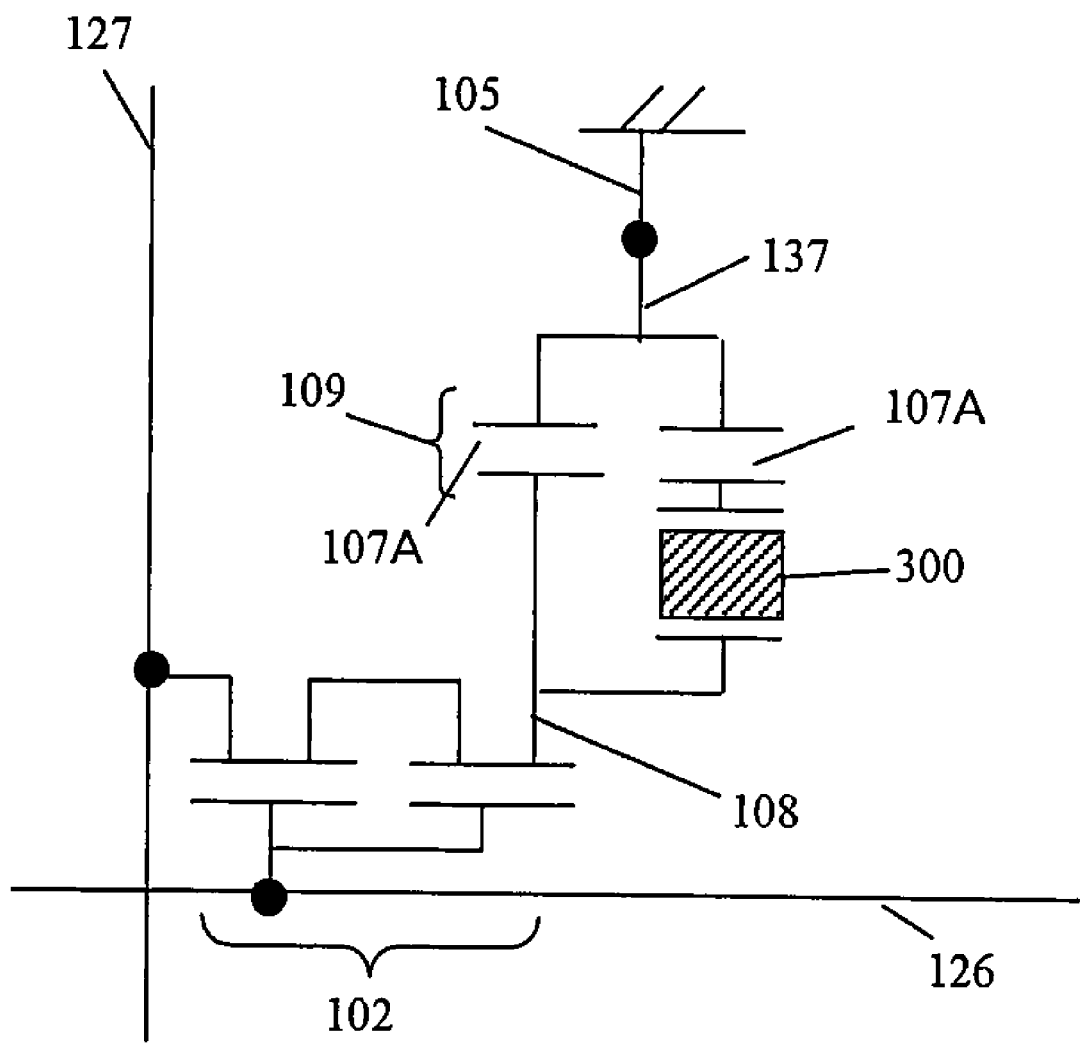
FIG. 29 is an equivalent circuit diagram of a pixel region in the Embodiment 3 of the invention.

FIG. 29 is an equivalent circuit diagram of the pixel region in the Embodiment 3 of the present invention. The voltage applied on the pixel electrode is maintained at a constant level by the storage capacitor 109, which is provided via the capacity insulator film 107A between the transparent pixel electrode 108 and the transparent common electrode 137 even after the TFT is turned off, and the voltage is applied on the liquid crystal 300.

In the Embodiment 3, the polarizer, the retardation film, and the retardation film deposited on the reflective common electrode 105 are adjusted so that both the transmitting region and the reflecting region are displayed in black color when the voltage is not applied on the liquid crystal 300. In particular, when the light entering the liquid crystal 300 is set to a linearly polarized light and the retardation film is designed as the so-called half wave plate, by which the linearly polarized light is converted to a circularly polarized light, the reduction of display contrast with respect to the change of layer thickness of the liquid crystal 300 can be suppressed. Instead of providing the retardation film, a polarized light absorption film may be disposed on the reflective common electrode 105. In this case, the characteristics of the transmitting region are more equalized with the characteristics of the reflecting region.

In any of the Embodiments as given above, a TFT using a semiconductor film made of amorphous Si, a semiconductor film of oxide such as ZnO, or an organic semiconductor film such as pentacene may be used as the semiconductor film instead of p-Si. Also, instead of ITO, a transparent conductive film of oxide such as ZnO, SnO, etc., a transparent organic conductive film, or finer metal lines of the level lower than μm may be used as the transparent electrode.

In the liquid crystal display unit in any of the Embodiments of the present invention, the backlight includes: an LED serving as the light source, a light guide plate to evenly project the light from the light source, and a prism sheet to convert the direction of the light from the light guide plate to approximately vertical direction. By projecting the backlight beam from an approximately vertical direction converging ratio of the lights reflected by the first and the second reflective films to the opening of the first reflective film can be improved, and effective transmittance can be attained.

On the counter substrate, which has the liquid crystal sealed in a gap between the TFT substrate and the counter substrate, a color filter to allow a light of specific color to pass is prepared. On the surfaces of the TFT substrate and the counter substrate to be in contact with the liquid crystal, alignment films to control the orientation of the liquid crystal are formed. Between the backlight and the TFT substrate and on outer side of the counter substrate, there are provided a polarizer and a retardation film to control the condition of polarization, and these have the functions to allow the light to pass or to absorb the light, depending on the condition of polarization of the light, which has passed through or is reflected by the liquid crystal. According to the present invention, when no voltage is applied on the liquid crystal, both the transmitting region and the reflecting region are designed in the so-called normally-off type so that the light does not transmit the polarizer on the counter substrate side.

The invention claimed is:

1. A liquid crystal display unit, comprising a first substrate with a thin-film transistor provided thereon, and a second substrate with a color filter formed thereon, said first substrate and said second substrate are attached together, and a liquid crystal is sealed in a gap between said first substrate and said second substrate, wherein there are provided:
    a first reflective electrode installed on inner surface of said first substrate and having reflective surfaces on front and rear surfaces, said first reflective electrode having a reflective lens structure with a convex portion to face toward said second substrate, and having an opening at the vertex of said convex portion;
    a second reflective film disposed between said first reflective electrode and said first substrate and under said opening of said first reflective electrode, said second reflective film having reflective surface on a front surface facing to said first reflective electrode;
    a light entering from said first substrate is reflected by the rear surface of said first reflective electrode and by the front surface of said second reflective film, said light is converged to said opening of said first reflective electrode and is allowed to pass toward said second substrate; and
    wherein said first reflective electrode of a reflective lens structure with a convex portion is over an organic PAS film prepared on said first substrate and is designed in such shape as to match surface roughness of said organic PAS film.

2. A liquid crystal display unit according to claim 1, wherein and
    said second reflective film is under said organic PAS film.

3. A liquid crystal display unit according to claim 2, wherein said second reflective film is on the same layer as a signal line layer of said thin-film transistor.

4. A liquid crystal display unit according to claim 1, further comprising:
    a transparent pixel electrode for driving said liquid crystal via an insulator film over said first reflective electrode.

5. A liquid crystal display unit according to claim 4, wherein said first reflective electrode is a common electrode.

6. A liquid crystal display unit according to claim 5, wherein said transparent pixel electrode is connected to a source electrode or to a drain electrode of said thin-film transistor.

7. A liquid crystal display unit according to claim 4, wherein a storage capacitor is formed by said first reflective electrode and said transparent pixel electrode, and by an insulator film between said first reflective electrode and said transparent pixel electrode.

8. A liquid crystal display unit, comprising a first substrate with a thin-film transistor provided thereon, and a second substrate with a color filter formed thereon, said first substrate and said second substrate are attached together, and a liquid crystal is sealed in a gap between the said first substrate and said second substrate, wherein there are provided:
    a first reflective electrode installed on inner surface of said first substrate and having reflective surfaces on front and rear surfaces, said first reflective electrode having a reflective lens structure with a convex portion to face toward said second substrate, and having an opening at the vertex of said convex portion;
    a second reflective film disposed between said first reflective electrode and said first substrate and under said opening of said first reflective electrode, said second reflective film having reflective surface on the surface facing to said first reflective electrode;
    said liquid crystal display unit, further comprising a transparent pixel electrode for driving said liquid crystal via an insulator film over said first reflective electrode, and a reflective electrode formed on said transparent electrode by avoiding said opening of said first reflective electrode; and
    a light entering from the direction of said first substrate is reflected by rear surface of said first reflective electrode and by front surface of said second reflective film, and said light is converged to said opening of said first reflective electrode and is allowed to pass toward said second substrate via said transparent pixel electrode.

9. A liquid crystal display unit according to claim 8, wherein said first reflective electrode of a reflective lens structure with a convex portion is over an organic PAS film prepared on said first substrate and is designed in such shape as to match surface roughness of said organic PAS film; and said transparent pixel electrode is formed on an insulator film with surface shape similar to surface roughness of said first reflective electrode over said first reflective electrode.

10. A liquid crystal display unit according to claim 8, wherein said first reflective electrode of a reflective lens structure with a convex portion is over an organic PAS film prepared on said first substrate and is designed in such shape as to match surface roughness of said organic PAS film;

said transparent pixel electrode is formed on an insulator film with surface shape similar to surface roughness of said first reflective electrode over said first reflective electrode; and said second reflective film is under said organic PAS film.

11. A liquid crystal display unit according to claim 10, wherein said second reflective film is on the same layer as a signal line layer of said thin-film transistor.

12. A liquid crystal display unit according to claim 8, wherein said transparent pixel electrode is for driving said liquid crystal.

13. A liquid crystal display unit according to claim 12, wherein said transparent pixel electrode is connected to a source electrode or to a drain electrode of said thin-film transistor.

14. A liquid crystal display unit according to claim 8, wherein a storage capacitor is maintained by said first reflective electrode and said transparent pixel electrode, and by an insulator film between said first reflective electrode and said transparent pixel electrode.

15. A liquid crystal display unit, comprising one a first substrate with a thin-film transistor provided thereon, and a second substrate with a color filter formed thereon, said one first substrate and said second substrate are attached together, and a liquid crystal is sealed in a gap between said first substrate and said second substrate, wherein there are provided:

a first reflective electrode installed on inner surface of said first substrate and having reflective surfaces on front and rear surfaces, said first reflective electrode having a reflective lens structure with a convex portion to face toward said eenntef second substrate, and having an opening at the vertex of said convex portion;

a second reflective film disposed between said first reflective electrode and said first substrate and under said opening of said first reflective electrode, said second reflective film having reflective surface on the surface facing to said first reflective electrode;

said liquid crystal display unit further comprising:

a retardation film formed over said first reflective electrode via an organic PAS film;

a transparent common electrode prepared on said retardation film; and a transparent pixel electrode having an opening via an insulator film over said transparent common electrode, wherein:

a light entering from the direction of said first substrate is reflected by rear surface of said first reflective electrode and by front surface of said second reflective film and is converged to said opening of said first reflective electrode and is allowed to pass toward said second substrate.

16. A liquid crystal display unit according to claim 15, wherein said first reflective electrode of a reflective lens structure with a convex portion is over an organic PAS film prepared on said first substrate and is designed in such shape as to match surface roughness of said organic PAS film.

17. A liquid crystal display unit according to claim 15, wherein said first reflective electrode of a reflective lens structure with a convex portion is over an organic PAS film prepared on said first substrate and is designed in such shape as to match surface roughness of said organic PAS film; and said second reflective film is under said organic PAS film.

18. A liquid crystal display unit according to claim 17, wherein said second reflective film is on the same layer as a signal line layer of said thin-film transistor.

19. A liquid crystal display unit according to claim 15, wherein said transparent pixel electrode is connected to a source electrode or to a drain electrode of said thin-film transistor.

20. A liquid crystal display unit according to claim 15, wherein a storage capacitor is maintained by said first reflective electrode and said transparent pixel electrode, and by an insulator film between said first reflective electrode and said transparent pixel electrode.

21. A liquid crystal display unit according to claim 15, wherein said color filter and said protective film are provided on inner surface of said second substrate, and a concave portion is formed on a protective film to match the opening of said transparent pixel electrode.

* * * * *